United States Patent
Takagi et al.

(10) Patent No.: US 10,870,371 B2
(45) Date of Patent: Dec. 22, 2020

(54) OPERATION DEVICE

(71) Applicant: ANSEI CORPORATION, Obu (JP)

(72) Inventors: Masaharu Takagi, Nagoya (JP); Satoshi Umezu, Nagoya (JP); Yukio Iwase, Nagoya (JP)

(73) Assignee: ANSEI CORPORATION, Obu (JP)

( * ) Notice: Subject to any disclaimer, the term of this patent is extended or adjusted under 35 U.S.C. 154(b) by 42 days.

(21) Appl. No.: 16/225,521

(22) Filed: Dec. 19, 2018

(65) Prior Publication Data

US 2020/0017002 A1 Jan. 16, 2020

(30) Foreign Application Priority Data

Jul. 10, 2018 (JP) .................. 2018-130699

(51) Int. Cl.
*B60N 2/22* (2006.01)
*B60N 2/12* (2006.01)

(52) U.S. Cl.
CPC ............. *B60N 2/2245* (2013.01); *B60N 2/12* (2013.01)

(58) Field of Classification Search
CPC ............................... B60N 2/2245; B60N 2/12
USPC ............................................ 297/463.1, 463.2
See application file for complete search history.

(56) References Cited

U.S. PATENT DOCUMENTS

| | | | |
|---|---|---|---|
| 7,938,490 B2 * | 5/2011 | Ishijima ............... | B60N 2/0296 297/463.1 |
| 9,090,179 B2 | 7/2015 | Ishii et al. | |
| 9,290,116 B2 * | 3/2016 | Teufel ...................... | B60N 2/12 |
| 10,011,203 B2 | 7/2018 | Uehara et al. | |
| 2004/0127114 A1 | 7/2004 | Iwakami et al. | |
| 2009/0218866 A1 * | 9/2009 | LaPointe ................ | A47C 7/465 297/463.1 |
| 2011/0175420 A1 | 7/2011 | Bruck | |

(Continued)

FOREIGN PATENT DOCUMENTS

| JP | S54107794 U | 7/1979 |
|---|---|---|
| JP | 2006038217 A | 2/2006 |

(Continued)

OTHER PUBLICATIONS

Office Action from the Japanese Patent Office dated Jul. 23, 2019 in related Japanese application No. 2018-130699, and machine translation thereof.

*Primary Examiner* — Anthony D Barfield
(74) *Attorney, Agent, or Firm* — J-Tek Law PLLC; Jeffrey D. Tekanic; Scott T. Wakeman

(57) ABSTRACT

An operation device (1) includes first bases (81A, 81B) and/or second bases (72A, 72B) that are elastically deformable in the direction of a pivot axis (X1) so that a shaft (120) can be inserted into a shaft hole (110). A first protrusion (121) is formed on a distal end portion of the shaft and projects radially outward from an outer sliding surface (120E). The first bases (81A, 81B) include a first escape section (111) recessed radially outward from an inner sliding surface (110E). The first escape section allows the first protrusion to pass through the first base when the shaft is being inserted into the shaft hole with an operation member (80) located in an initial position. A first slip-off preventing section (113) circumferentially adjacent to the first escape section prevents the shaft from coming out of the shaft hole when the operation member is pivoted from the initial position to an end position.

18 Claims, 12 Drawing Sheets

(56) References Cited

U.S. PATENT DOCUMENTS

| | | |
|---|---|---|
| 2011/0187171 A1 | 8/2011 | Ishii et al. |
| 2011/0233981 A1 | 9/2011 | Ishii et al. |
| 2013/0187425 A1 | 7/2013 | Pleskot |
| 2015/0306978 A1 | 10/2015 | Watanabe |
| 2017/0151899 A1 | 6/2017 | Uehara et al. |

FOREIGN PATENT DOCUMENTS

| | | |
|---|---|---|
| JP | 2010274903 A | 12/2010 |
| JP | 2017101700 A | 6/2017 |

* cited by examiner

US 10,870,371 B2

OPERATION DEVICE

CROSS-REFERENCE

This application claims the priority benefit of Japanese Patent Application No. 2018-130699 filed on Jul. 10, 2018, the entire contents of which are incorporated by reference as if fully set forth herein.

TECHNICAL FIELD

The present invention relates to an operation device, such as a seatback recline lever for setting a recline of a vehicle seatback.

BACKGROUND ART

Japanese Patent Application Laid-Open Publication No. 2017-101700 and its family member US 2017/0151899 A1 disclose an operation device that includes a support member and an operation member. The operation member is supported by the support member so as to be pivotable about a pivot axis. The operation member is manually pivotable from an initial position to an end position.

More specifically, the support member is a handle housing 70 and the operation member is an operation (manual) lever 80. The support member (handle housing) includes a first base (second wall and third wall) and a shaft hole (support hole). The shaft hole penetrates through the first base and defines an axial direction for a shaft of the operation lever. The shaft hole has a cylindrical inner sliding surface that is concentric with the pivot axis.

The operation member includes a second base (lever main body) and the above-noted shaft (shaft section). The shaft projects from the second base and extends in the axial direction. The shaft has a cylindrical outer sliding surface that is also concentric with the pivot axis.

SUMMARY OF THE INVENTION

Although not explicitly described in JP 2017-101700 and US 2017/0151899, the first base and/or the second base of the operation device is elastically deformed in the axial direction in order to insert the shaft in the shaft hole.

Furthermore, if the user manually applies an excessively large force to the above-described operation device while pivoting the operation member from the (its) initial position to the (its) end position, the excessively large force will be transmitted to the first base and to the second base via the shaft hole and the shaft. Then, the first base and/or the second base will elastically deform in the axial direction and the shaft could come out of the shaft hole. Consequently, there is a risk that the operation member (operation lever) could come off (detach from) the support member (handle housing) when the operation member (operation lever) is manually moved (pulled) with an excessively large manual force.

It is therefore an object of the present teachings to disclose techniques and designs for preventing an operation member (operating lever) from coming off (detach from) a support member (handle housing) during manual operation of an operation device, such as a seatback recline lever for setting a recline of a vehicle seatback.

In one aspect of the present teachings, an operation device includes an operation member (e.g., an operation lever) supported by a support member (e.g., a handle or lever housing) so as to be manually pivotable about a pivot axis from an (its) initial position to an (its) end position. One of the support member and the operation member has a shaft hole that is defined in and/or penetrates through a first base and defines an axial direction. The shaft hole has a circular cylindrical inner sliding surface that is concentric with the pivot axis. The other of the support member and the operation member has a shaft that projects from a second base and extends in the axial direction. The shaft has a circular cylindrical outer sliding surface that is also concentric with the pivot axis. The first base and/or the second base is (are) elastically deformable in the axial direction so that the shaft can be inserted into the shaft hole. The shaft includes a first protrusion that is formed on a distal end portion of the shaft and projects radially outward from the outer sliding surface. The first base includes a first escape section that is recessed radially outward from the inner sliding surface. The first escape section allows (enables) the first protrusion to pass through the first base when the shaft is inserted into the shaft hole with the operation member located in the (its) initial position. A first slip-off preventing section is disposed adjacent to the first escape section in a circumferential direction of the shaft hole. The first slip-off preventing section prevents the shaft from coming out of the shaft hole when the operation member is pivoted from the (its) initial position to the (its) end position.

In such an operation device, when the shaft is inserted into the shaft hole, the first protrusion is prevented from interfering with the shaft insertion by the first escape section. Furthermore, even if the user applies an excessively large manual force while pivoting the operation member from the (its) initial position to the (its) end position, the first base and/or the second base can be prevented from being elastically deformed in the axial direction and the shaft can be prevented from coming out of the shaft hole owing to the first protrusion and the first slip-off preventing section.

Therefore, in such an operation device, it is possible to prevent the operation member from unintentionally coming off (detaching from) the support member.

In such an operation device, the first base preferably may have a first inclined surface that opposes the second base and is inclined so as to separate (be spaced apart) from the second base in the axial direction while extending radially outward away from the shaft hole. The first inclined surface is preferably disposed at a position different from the first escape section and the first slip-off preventing section when viewed along the pivot axis.

In such an embodiment of the present teachings, even if the first base and/or the second base elastically deforms in the axial direction while the shaft is being inserted into the shaft hole, the shaft can be easily inserted into the shaft hole by bringing the distal end of the shaft into slide contact with the first inclined surface. Furthermore, thinned portions of the first base can be distributed around the shaft hole because the first inclined surface is disposed at a position different from the first escape section and the first slip-off preventing section when viewed along the pivot axis, thereby avoiding a decrease in the strength and the rigidity of the first base.

In addition or in the alternative, the shaft preferably may have a second inclined surface that is inclined so as to approach the second base in the axial direction while extending radially outward. The second inclined surface is preferably disposed on an opposite side of the first protrusion across the pivot axis.

In such an embodiment, even if the first base and/or the second base elastically deforms in the axial direction while the shaft is being inserted into the shaft hole, the shaft can be easily inserted into the shaft hole by bringing the second inclined surface of the shaft into slide contact with the first base. When the first protrusion comes into slide contact with the first base, the load (stress) on the first base and/or the second base can be reduced because the second inclined surface is disposed on the opposite side of the first protrusion across the pivot axis. Therefore, breakage of the first protrusion during assembly of the operation device can be prevented.

In addition or in the alternative, the first base preferably has a contact section that is adjacent to the first slip-off preventing section on an opposite side of the first escape section. The contact section is configured to come into contact with the first protrusion when the operation member is pivoted to the (its) end position.

In such an embodiment, a simplified design can be realized because a stopper for stopping the operation member at the end position need not be separately provided.

Two sets of the first base, the shaft hole, the second base, and the shaft are preferably provided.

With such a configuration, the operation member can be more reliably prevented from coming off (detaching from) the support member because the operation member is double-supported by the support member.

Another operation device according to the present teachings includes: an operation member supported by a support member so as to be manually pivotable about a pivot axis from an (its) initial position to an (its) end position. One of the support member and the operation member has a shaft hole that is defined in and/or penetrating through a first base and defines an axial direction. The shaft hole has a circular cylindrical inner sliding surface that is concentric with the pivot axis. The other of the support member and the operation member has a shaft that projects from a second base and extends in the axial direction. The shaft has a circular cylindrical outer sliding surface that is concentric with the pivot axis. The first base and/or the second base is (are) elastically deformable in the axial direction so that the shaft can be inserted into the shaft hole. The first base includes a second protrusion that is formed at a position opposed to a root side of the shaft and that projects radially inward from the inner sliding surface. The shaft includes a second escape section that is recessed radially inward from the outer sliding surface. The second escape section allows (enables) the second protrusion to pass through the shaft when the shaft is being inserted into the shaft hole with the operation member located in the (its) initial position. A second slip-off preventing section is disposed (defined) adjacent to the second escape section in a circumferential direction of the shaft hole. The second slip-off preventing section prevents the shaft from coming out of the shaft hole when the operation member is pivoted from the (its) initial position to the (its) end position.

In such an operation device, when the shaft is being inserted into the shaft hole, the second protrusion is prevented from interfering with the shaft insertion by the second escape section. Furthermore, even if the user applies an excessively large manual force while pivoting the operation member (operation lever) from the (its) initial position to the (its) end position, the first base and/or the second base can be prevented from elastically deforming in the axial direction and the shaft can be prevented from coming out of the shaft hole owing to the second protrusion and the second slip-off preventing section.

Therefore, in such an operation device as well, it is possible to prevent the operation member from unintentionally coming off (detaching from) the support member.

Thus, with operation devices according to the present teachings, it is possible to prevent the operation member (operation lever) from unintentionally coming off (detaching from) the support member (handle housing).

DETAILED DESCRIPTION OF PREFERRED EMBODIMENTS

Embodiments 1 and 2, which are representative, non-limiting embodiments of the present teachings, are explained below with reference to the drawings.

Embodiment 1

Figure 1:
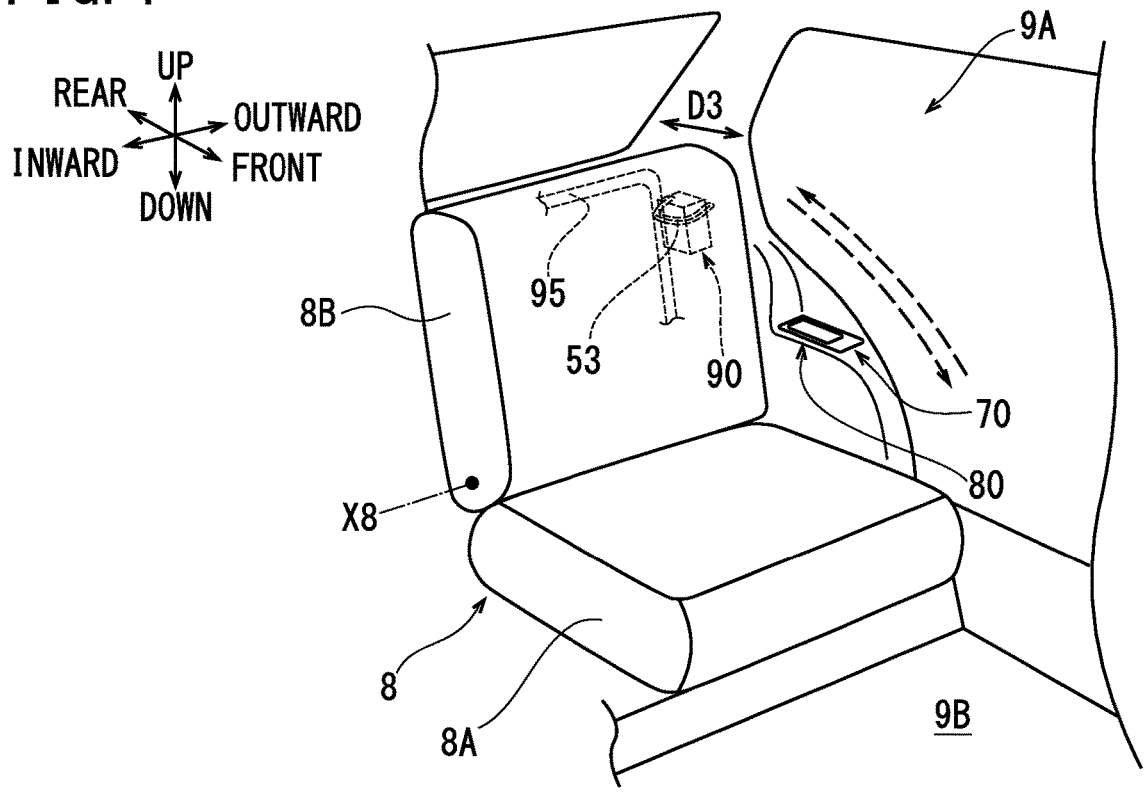
FIG. 1 is a schematic perspective view mainly showing a seat, etc. of a vehicle, in which an operation device according to Embodiment 1 is installed.

As shown in FIG. 1, a vehicle seat (rear seat) 8 is located in a vehicle interior 9A of an automobile, which is a representative, non-limiting example of a vehicle according to the present teachings. The vehicle seat 8 includes a seat body 8A on which an occupant sits and a backrest 8B on which the occupant leans.

It is noted that, in FIG. 1, the front of the occupant sitting on the vehicle seat 8, i.e. the paper surface near side, is the front of the vehicle. The rear of the occupant, i.e. the paper surface inner side, is the rear of the vehicle. The side on the right of the occupant sitting on the vehicle seat 8, i.e. the paper surface left side, is the inner side (interior) of the vehicle. The side on the left of the occupant, i.e. the paper surface right side, is the outer side (exterior) of the vehicle. All of the front-rear direction, the vehicle inward-outward direction, and the up-down direction shown in FIG. 2 and the subsequent figures are displayed in correspondence with the directions shown in FIG. 1.

Figure 2:
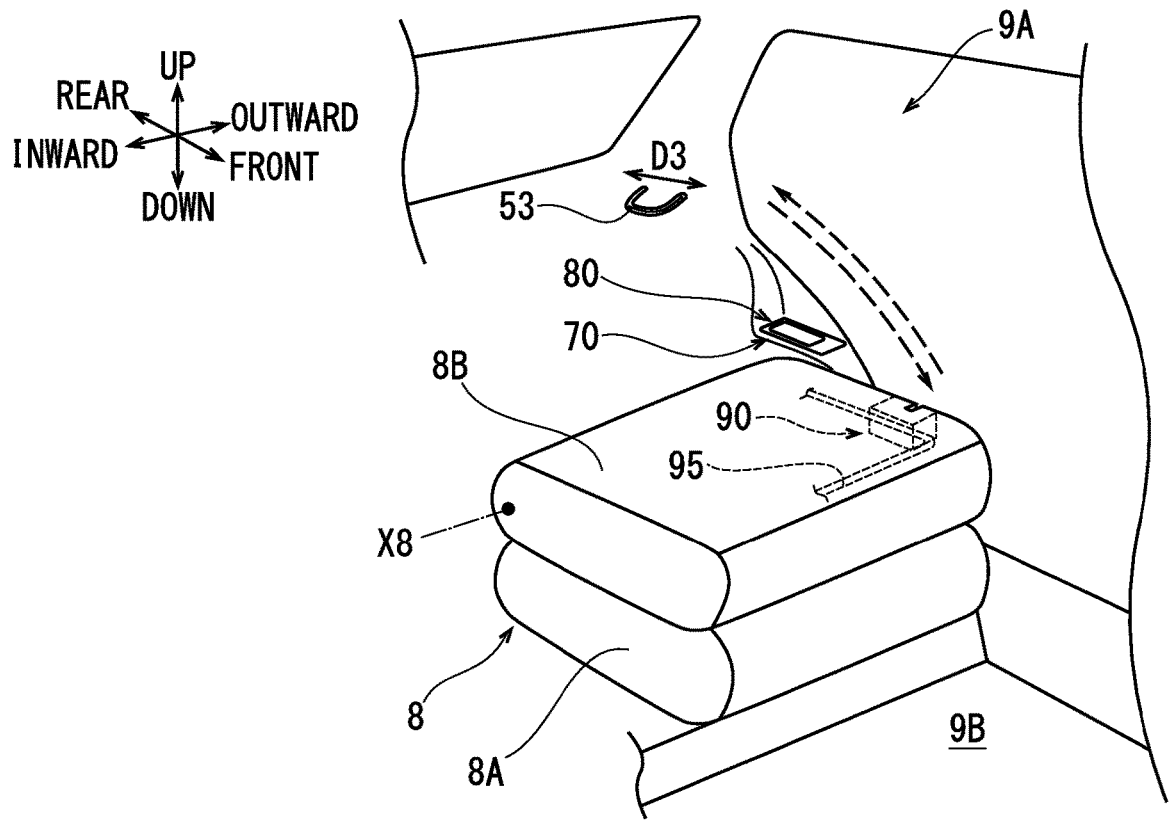
FIG. 2 is another schematic perspective view of the seat, etc. of FIG. 1 with the backrest (seatback) folded down.
Figure 3:
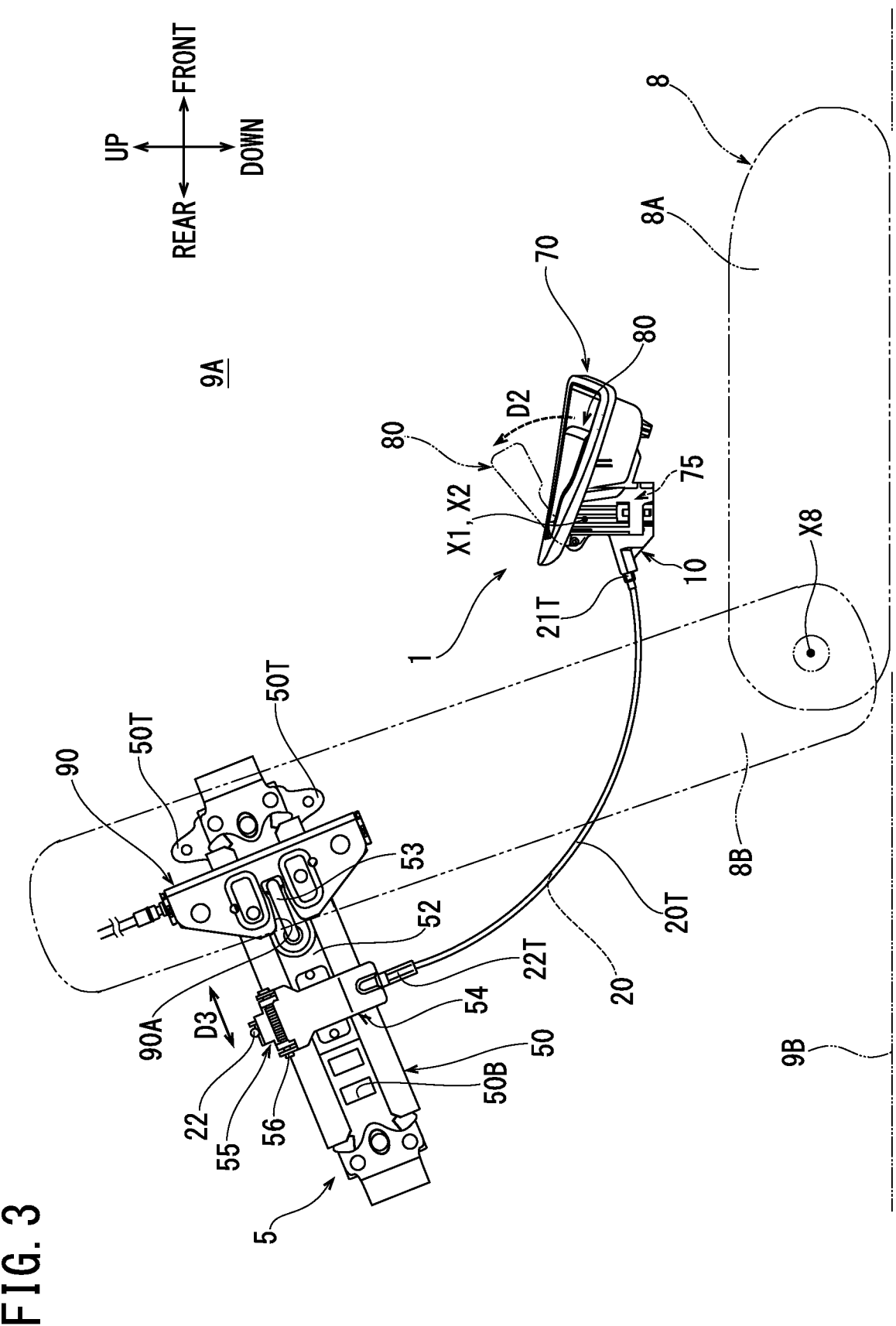
FIG. 3 is a schematic side view of the seat, etc. of FIG. 1.

As shown in FIGS. 1 to 3, the seat body 8A is fixed to the floor surface of a vehicle frame 9B. The backrest 8B is supported by the seat body 8A so as to be pivotable around (about) a pivot axis X8 extending in the vehicle inward-outward direction on the rear end side of the seat body 8A.

A handle housing 70 (i.e. a housing for pivotably supporting an operation lever, which may also be called a lever housing) is provided on (attached to) an inner wall of the vehicle interior 9A and is located on the vehicle outer side of the vehicle seat 8. The handle housing 70 is fixed to the inner wall (vehicle frame) of the vehicle interior 9A at a position where the occupant sitting on the vehicle seat 8 can conveniently reach the handle housing 70 with his/her left hand in order to operate (manually move or pull) an operation lever 80 that is pivotably supported by the handle housing 70. The occupant may manually operate (pull) the operation lever 80 when the occupant wants to tilt or incline (recline) the backrest 8B of the vehicle seat 8.

As shown in FIG. 3, a seat reclining device 5 is mounted on the vehicle frame 9B at a location on the vehicle outer side of the backrest 8B when the backrest 8B is located in its upright state. The seat reclining device 5 is configured to change the tilt or incline of the backrest 8B relative to the seat body 8A while fixing the backrest 8B to the vehicle frame 9B. In FIG. 3, the vehicle seat 8 is illustrated by an imaginary (two-dot chain) line because the vehicle seat 8 is located on the paper surface near side with respect to the handle housing 70 and the seat reclining device 5, i.e. the seat reclining device 5 is located behind the vehicle seat 8 in the side view of FIG. 3.

As shown in FIGS. 3 to 17, operation device 1 according to Embodiment 1 is a representative, non-limiting example of an operation device according to the present teachings. The operation device 1 is configured to transmit manual operations (manual movements, pulling) of the operation lever 80 to the seat reclining device 5.

As shown, e.g., in FIGS. 8 to 12, the operation device 1 includes the handle housing 70, the operation lever 80, a link case 10, a cable 20, a link lever 30, and a torsion coil spring 89. The handle housing (lever housing) 70 is one representative, non-limiting example of a "support member" according to the present teachings. The operation lever 80 is one representative, non-limiting example of an "operation member" according to the present teachings. The specific configuration of the operation device 1 of FIGS. 3 to 17 is explained in more detail below.

Figure 7:
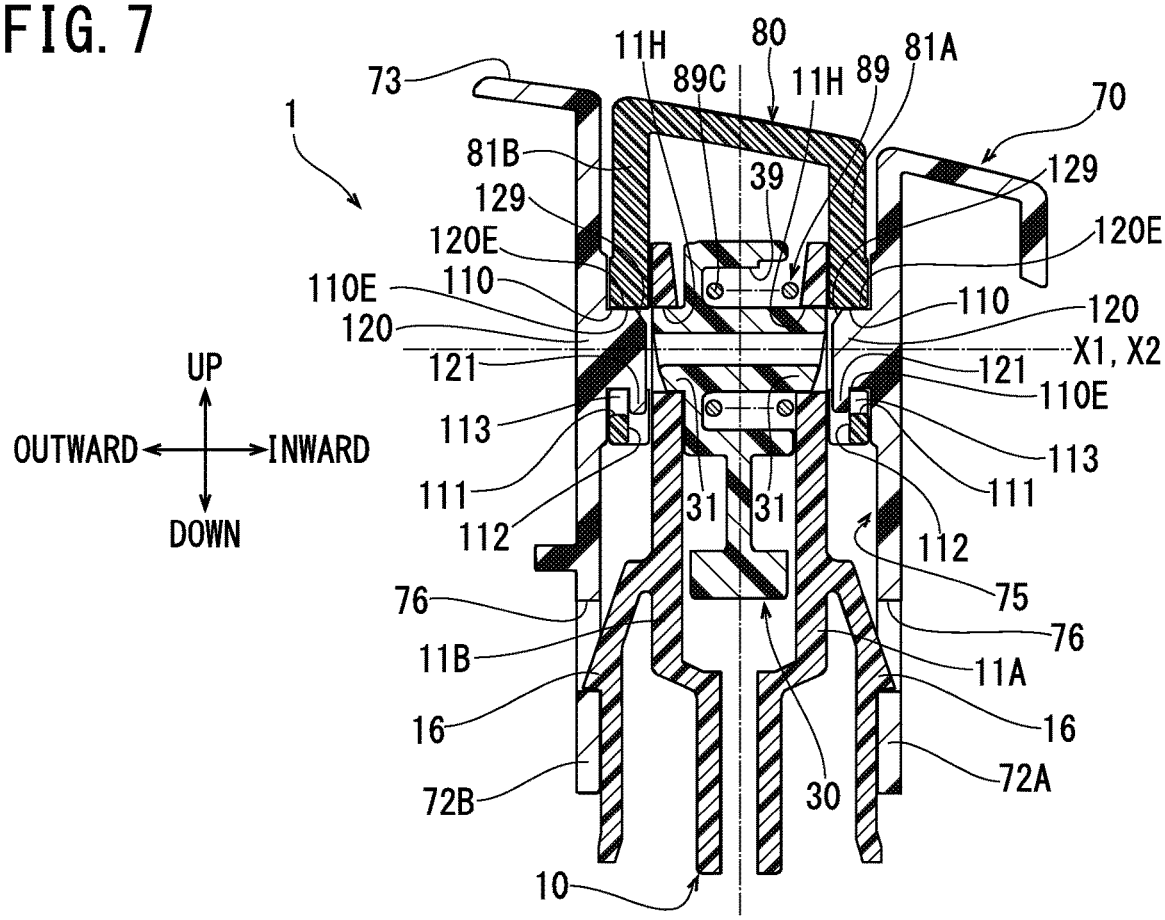
FIG. 7 shows a cross-section along line A-A in FIG. 6.

As shown, e.g., in FIG. 7, the link case 10 is housed in a housing chamber 75 formed (defined) in the handle housing 70. As shown, e.g., in FIGS. 4 and 8, the cable 20 is inserted through an outer tube (sheath) 20T. A first end 21 of the cable 20 is connected to the operation lever 80 via the link lever 30, which is pivotably supported by the link case 10.

Figure 4:
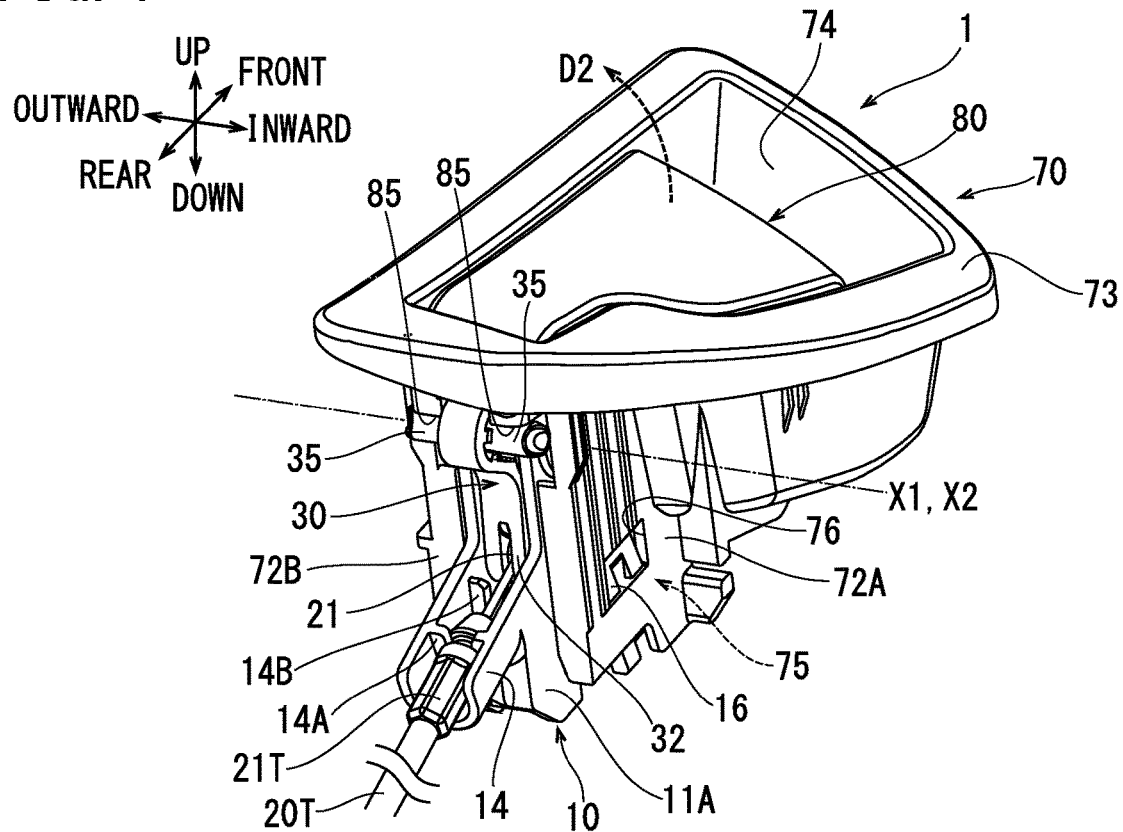
FIG. 4 is a perspective view of the operation device according to Embodiment 1.

When the operation lever 80 is pivoted in operation (pivot) direction D2 shown, e.g., in FIG. 4, the first end 21 of the cable 20 is displaced forward and the cable 20 slides in (relative to) the outer tube 20T. This movement causes a second end 22 of the cable 20 (FIG. 5) to be displaced (pulled) downward.

As shown in FIGS. 1 and 2, a lock device 90 is mounted on a seat frame 95 disposed within the backrest 8B. As shown in FIGS. 1 and 3, the lock device 90 is disposed at an upper end and at a corner on the vehicle outer side of the backrest 8B in the upright state. As shown in FIG. 3, the lock device 90 has a well-known configuration including an entry opening 90A and a not-shown fork that is displaceable (pivotable) to close the entry opening 90A.

As shown in FIGS. 1-3 and 5, the seat reclining device 5 includes a striker 53 formed by bending a metal round bar into a substantial "U" shape. When the not-shown fork engages (holds) the striker 53 of the seat reclining device 5 in the entry opening 90A, the lock device 90 fixes the tilt or incline of the backrest 8B relative to the seat body 8A.

It is noted that, although illustration is omitted, a release lever that acts on the lock device 90 to disengage (release) the striker 53 from the lock device 90 is provided at the upper end of the backrest 8B. When the occupant operates the release lever and disengages the lock device 90 and the striker 53, the backrest 8B can be brought (folded) down forward by pivoting about the pivot axis X8 as shown in FIG. 2.

Figure 5:
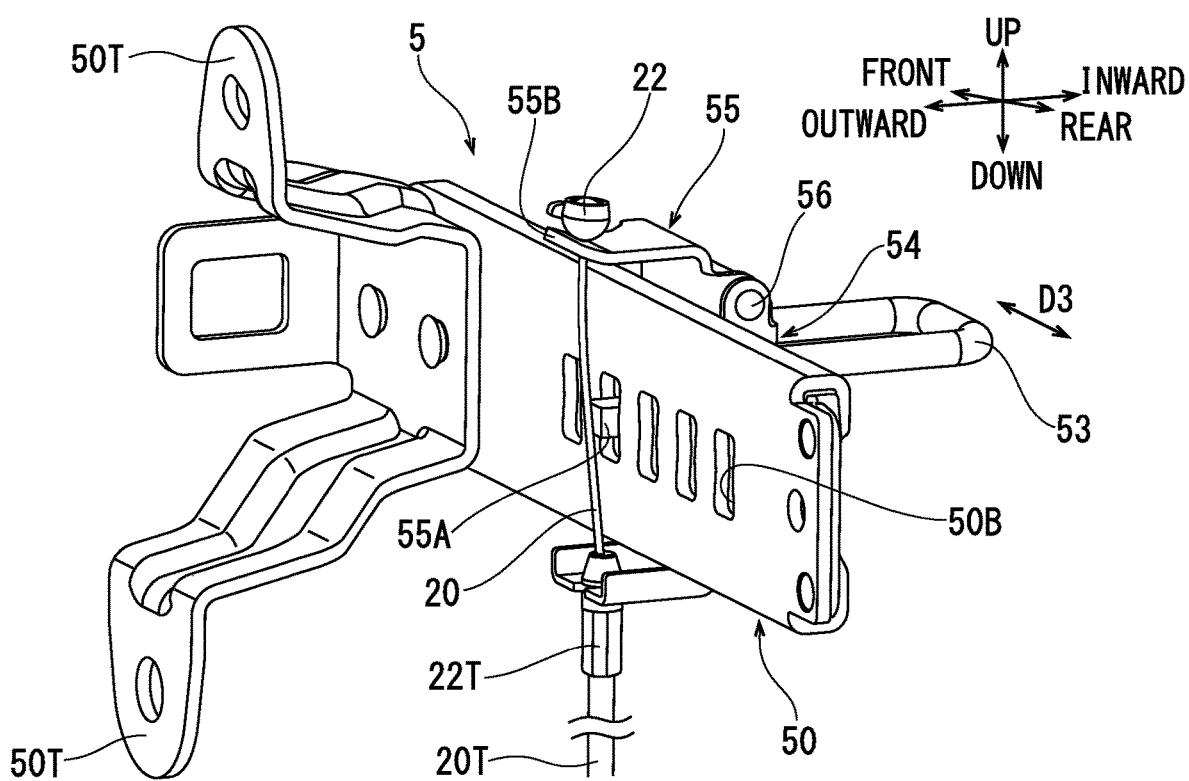
FIG. 5 is a perspective view showing a cable of the operation device according to Embodiment 1 connected to a seat reclining device.

As shown in FIGS. 3 and 5, the seat reclining device 5 includes a rail 50, a slider 52, and a lock lever 55.

The rail 50 is formed by bending a metal steel plate into a substantial "C" shape in cross-section and is formed in a shape that linearly extends in slide direction D3. The slide direction D3 inclines downward from the front toward the rear. An attachment section 50T bent in a substantial crank shape is attached to the rail 50. The attachment section 50T is fastened to the vehicle frame 9B using not-shown locking screws, whereby the rail 50 is fixed to the vehicle frame 9B. Latch holes 50B penetrate through the rail 50 and are disposed side by side in the slide direction D3.

As shown in FIG. 3, the slider 52 is a substantially rectangular metal plate that is elongated in the slide direction D3. The slider 52 is housed in the rail 50. The striker 53 and a lever support member 54 are fixed to the slider 52 such that the slider 52 is integrated (integral) with the striker 53 and the lever support member 54. The slider 52 is slidably guided by the rail 50 in the slide direction D3.

As shown in FIGS. 3 and 5, the lock lever 55 is pivotably supported about a pivot shaft 56 that is held on the upper end of the lever support member 54. The lock lever 55 includes an input section 55B that extends upward from the pivot shaft 56 and thereafter projects toward the vehicle outer side. The lock lever 55 includes, as shown in FIG. 5, a latch claw 55A that extends farther downward than the pivot shaft 56 and thereafter projects toward the vehicle outer side.

The lock lever 55 is urged by a not-shown torsion coil spring in a direction in which the latch claw 55A is advanced towards the vehicle outer side. Consequently, when the latch claw 55A opposes any one of the plurality of latch holes 50B of the rail 50, the latch claw 55A advances into the interior of the latch hole 50B such that the latch claw 55A engages the latch hole 50B to restrict sliding of the slider 52 relative to the rail 50. Therefore, for example, when the latch claw 55A engages the frontmost latch hole 50B, the striker 53 is fixed at the frontmost position. When the latch claw 55A engages the rearmost latch hole 50B, the striker 53 is fixed at the rearmost position.

The lower end of the lever support member 54 projects toward the vehicle outer side. An end 22T of the outer tube 20T near the second end 22 of the cable 20 is locked to the lower end of the lever support member 54. The second end 22 of the cable 20 is coupled to the input section 55B of the lock lever 55.

When the occupant operates (pulls) the operation lever 80 to pivot the operation lever 80 in the operation direction D2 shown, e.g., in FIG. 4 to change the tilt or incline of the backrest 8B, the second end 22 of the cable 20 shown in FIG. 5 is displaced (pulled) downward. Consequently, the lock lever 55 pivots, whereby the latch claw 55A retracts (moves) towards the vehicle inner side and separates from the latch hole 50B. As a result, sliding of the slider 52 relative to the rail 50 is allowed (no longer restricted) and the position of the striker 53 can be changed. The position of the striker 53 is displaced stepwise in the slide direction D3 shown in FIGS. 1-3 and 5, whereby the displacement is transmitted to the backrest 8B via the lock device 90. The tilt or incline of the backrest 8B changes stepwise.

Specific Configuration of Operation Device 1

As shown in FIGS. 4 and 6-17, the handle housing 70, the operation lever 80, the link case 10, and the link lever 30 of the operation device 1 are each resin molded products (plastic parts) and are manufactured, for example, by injection molding a thermoplastic resin.

Figure 8:
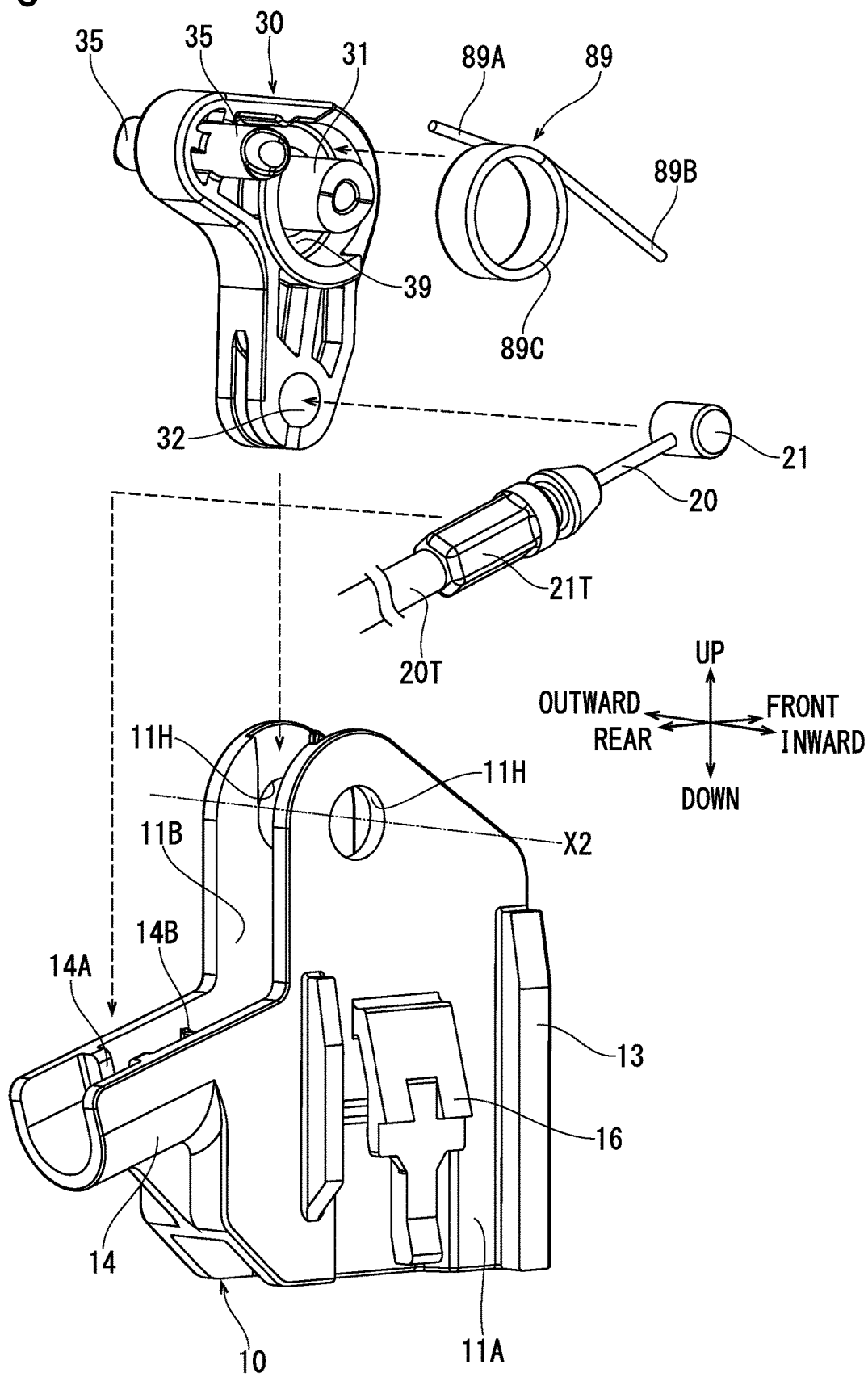
FIG. 8 is an exploded perspective view showing a link case, a link lever, a biasing member, and a cable of the operation device according to Embodiment 1.

As shown in FIGS. 7 and 8, the torsion coil spring 89 is formed by bending a steel spring wire. The torsion coil spring 89 includes a first end 89A, a second end 89B and a coil section 89C connecting the first end 89A to the second end 89B.

As shown in FIGS. 5 and 8, the cable 20 of the present embodiment is a steel wire rope obtained by intertwining (braiding) a plurality of steel wires. The cable 20 is slidably inserted through a flexible outer tube (sheath) 20T. The first end 21 of the cable 20 is constituted by a metal end part affixed to the distal end of the steel wire rope. An end 21T of the outer tube 20T near the first end 21 of the cable 20 is a well-known component having mating grooves recessed in the outer annular shape.

It is noted that, in the following explanation concerning the shapes, etc. of the components of the operation device 1, the explanation is based on the state in which, with regard to the front-rear direction, the up-down direction, and the vehicle inward-outward direction, as shown in FIGS. 1 to 3, the handle housing 70 and the operation lever 80 are mounted on the inner wall of the vehicle interior 9A and, as shown, e.g., in FIG. 4, the link case 10 is housed in the housing chamber 75 of the handle housing 70.

As shown in FIGS. 4, 6, 7, 9, and 10, the handle housing (operation lever housing) 70 includes a flange section 73, a recessed section 74, and second bases (second base walls) 72A and 72B.

Figure 9:
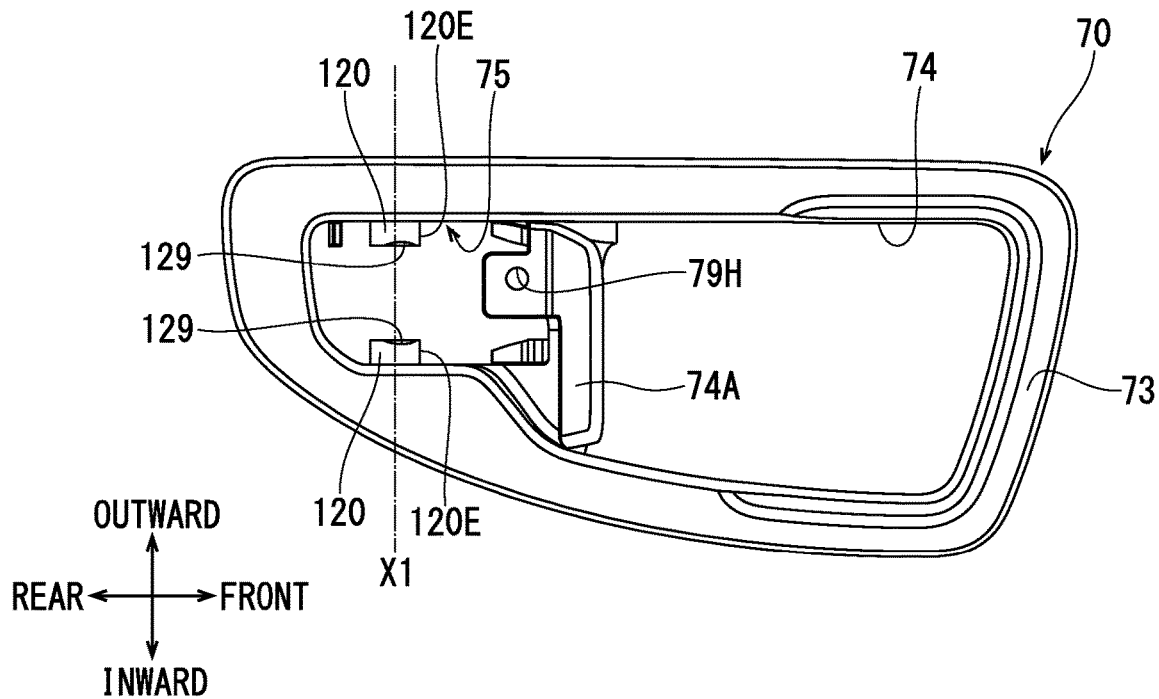
FIG. 9 is a top view of a handle housing of the operation device according to Embodiment 1.

As shown, e.g., in FIG. 9, the flange section 73 is formed in a substantially annular shape that is elongated in the front-rear direction when viewed from above and is designed such that the inner width of a front portion is larger than the inner width of the rear portion. The upper surface of the flange section 73 is formed as a design (ornamental) surface that is exposed to the vehicle interior 9A.

The recessed section 74 is formed in a substantial box shape that opens upward. The upper end edges of the front wall, the side wall on the vehicle inner side, and the side wall on the vehicle outer side of the recessed section 74 are connected to the inner peripheral edge of the front portion of the flange section 73. A rear wall 74A of the recessed section 74 is located at the boundary between the front portion and the rear portion of the flange section 73. The upper end edge of the rear wall 74A is located at a position slightly lower than the upper surface of the flange section 73.

Figure 15:
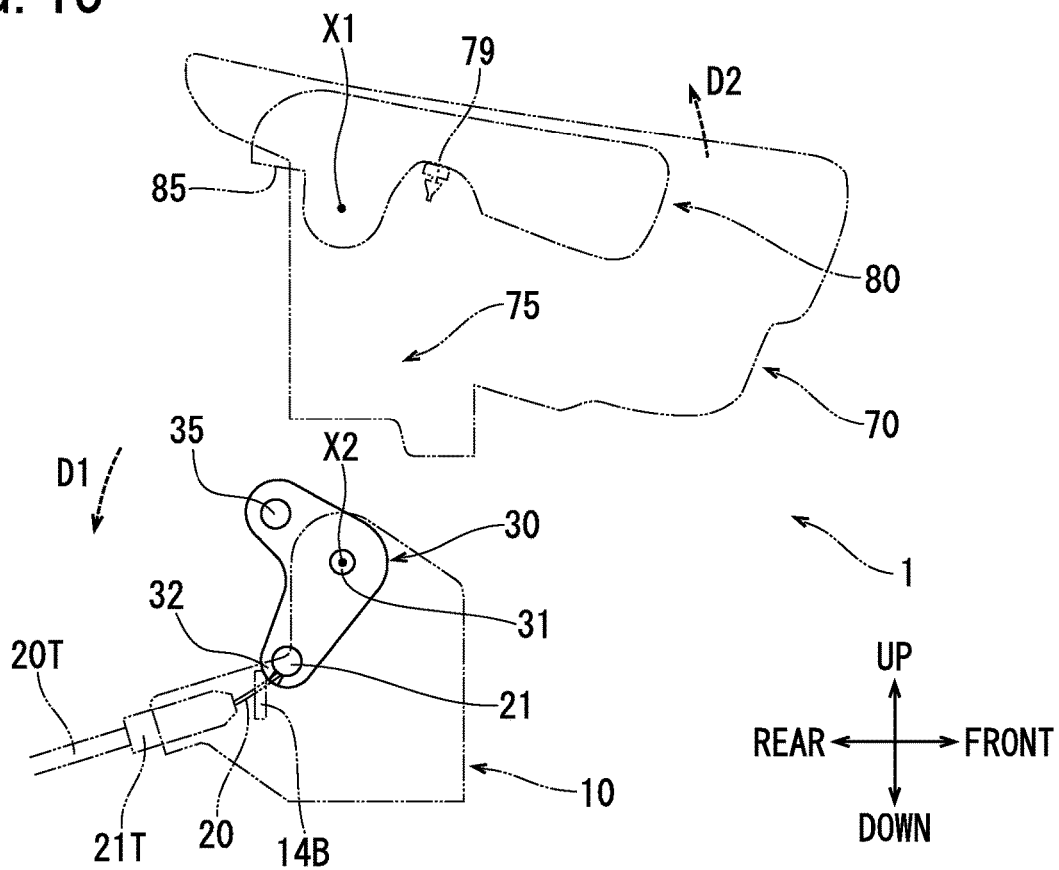
FIG. 15 is a schematic side view of the link case prior to assembly with the handle housing.
Figure 16:
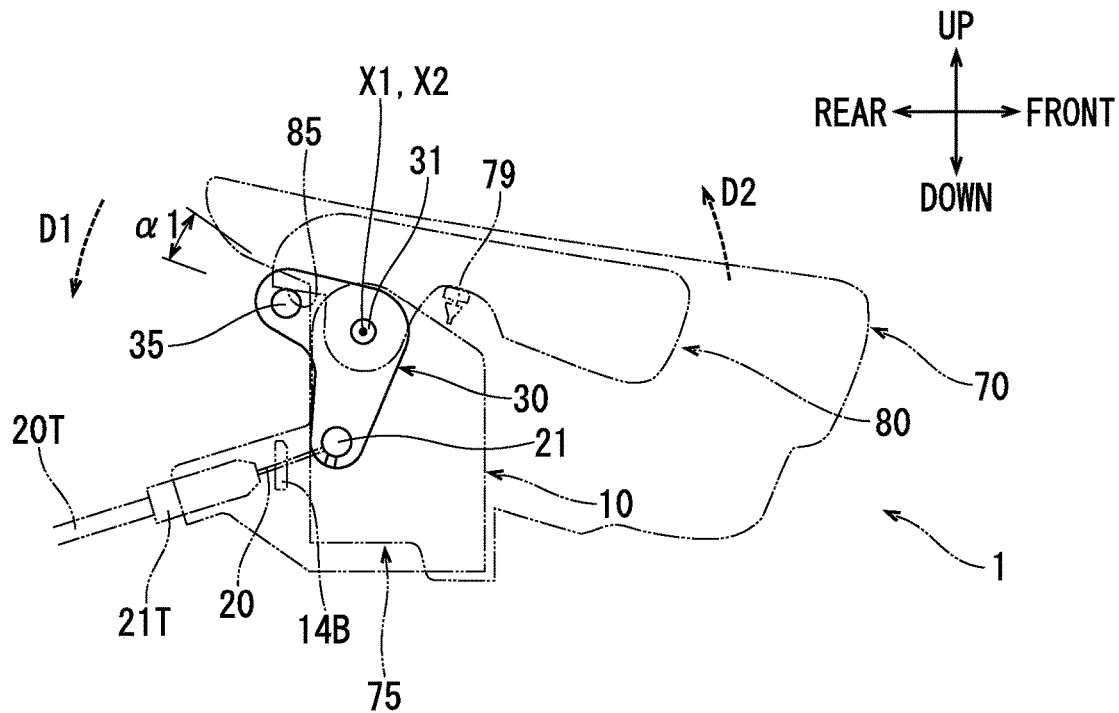
FIG. 16 is a schematic side view of the link case assembled with the handle housing and the operation lever disposed at its initial position.
Figure 17:
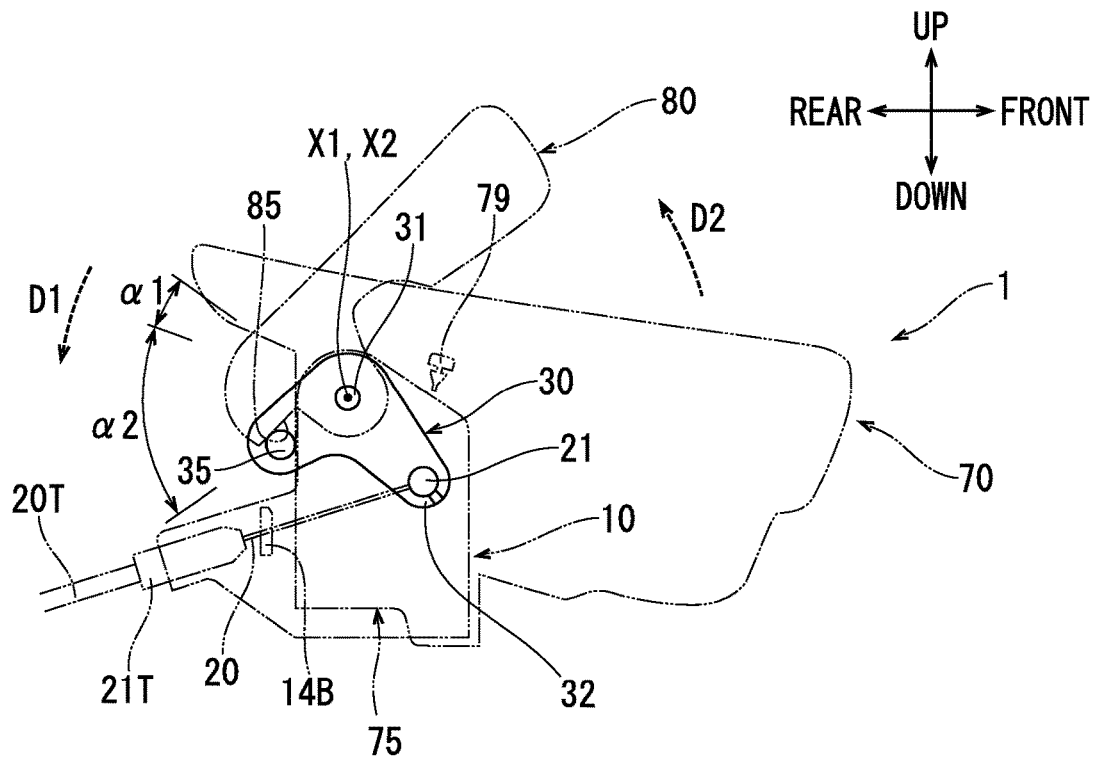
FIG. 17 is a schematic side view similar to FIG. 16 with the operation lever disposed at its end position.

A damper attachment hole 79H (FIGS. 9 and 10) penetrates through the upper end edge of the rear wall 74A. A damper 79, as shown in a simplified manner in FIGS. 15 to 17, is attached to the damper attachment hole 79H. The damper 79 is a cushioning element made of rubber, elastomer, or the like.

As shown in FIGS. 4, 6, 7, 9, and 10, the second bases 72A and 72B are provided farther rearward than the recessed section 74 in the handle housing 70. The second base 72A is connected to the sidewall on the vehicle inner side of the recessed section 74 and extends in a substantial flat shape toward the rear so as to separate from the recessed section 74. The second base 72B is connected to the sidewall on the vehicle outer side of the recessed section 74 and extends in a substantial flat shape toward the rear so as to separate from the recessed section 74. Both upper end edges of the second bases 72A and 72B are connected to the inner peripheral edge of the rear portion of the flange section 73.

Figure 10:
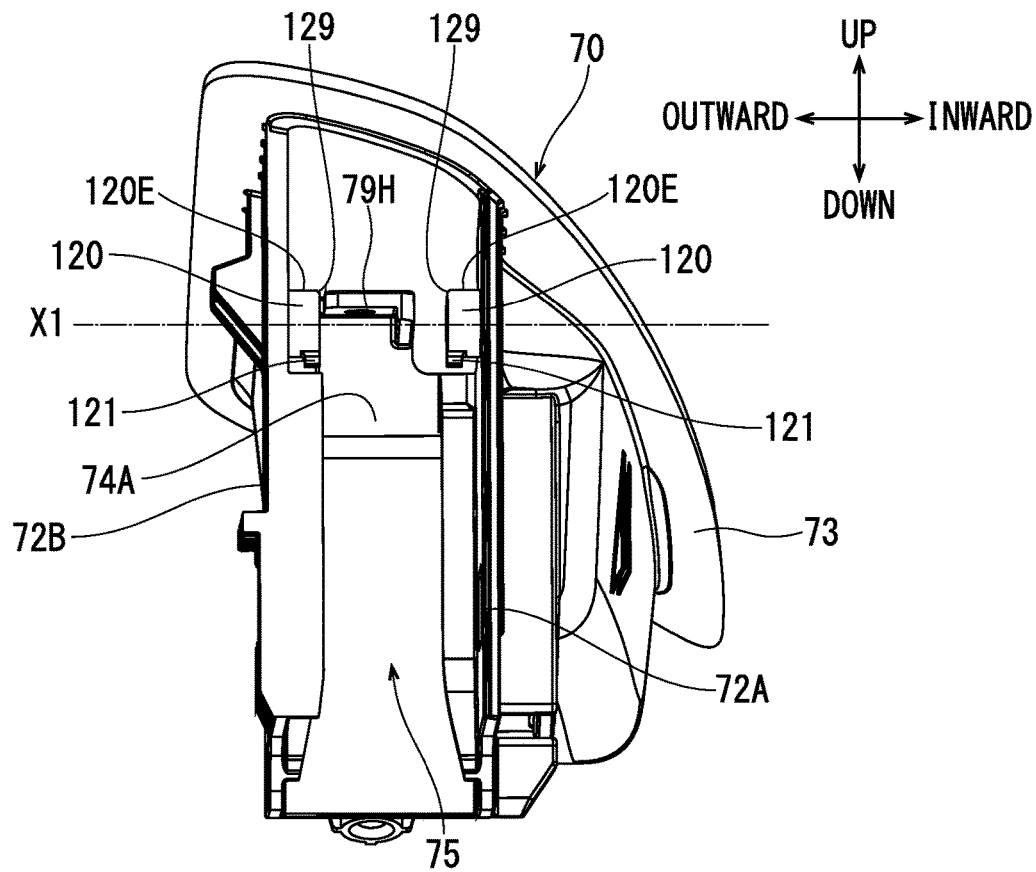
FIG. 10 is a perspective view of the handle housing viewed substantially from the rear.

As shown in FIGS. 7, 9, and 10, first and second columnar shafts 120 and 120 are respectively formed on a surface of the second base 72A that faces the vehicle outer side and on a surface of the second base 72B that faces the vehicle inner side.

The first shaft 120 on the second base 72A projects toward the vehicle outer side from the second base 72A and defines a first axis X1 extending in the vehicle inward-outward direction. The second shaft 120 on the second base 72B projects toward the vehicle inner side from the second base 72B and also defines the first axis X1. The first axis X1 is a representative, non-limiting example of a "pivot axis" according to the present teachings. The first and second shafts 120 and 120 each have an outer sliding surface 120E. The outer sliding surfaces 120E are both formed in a cylindrical shape that is concentric with the first axis X1.

It is noted that each of the first and second shafts 120 has a first protrusion 121 and a second inclined surface 129. The configurations of the first protrusions 121, 121 and the second inclined surfaces 129, 129 are explained in more detail below.

Figure 6:
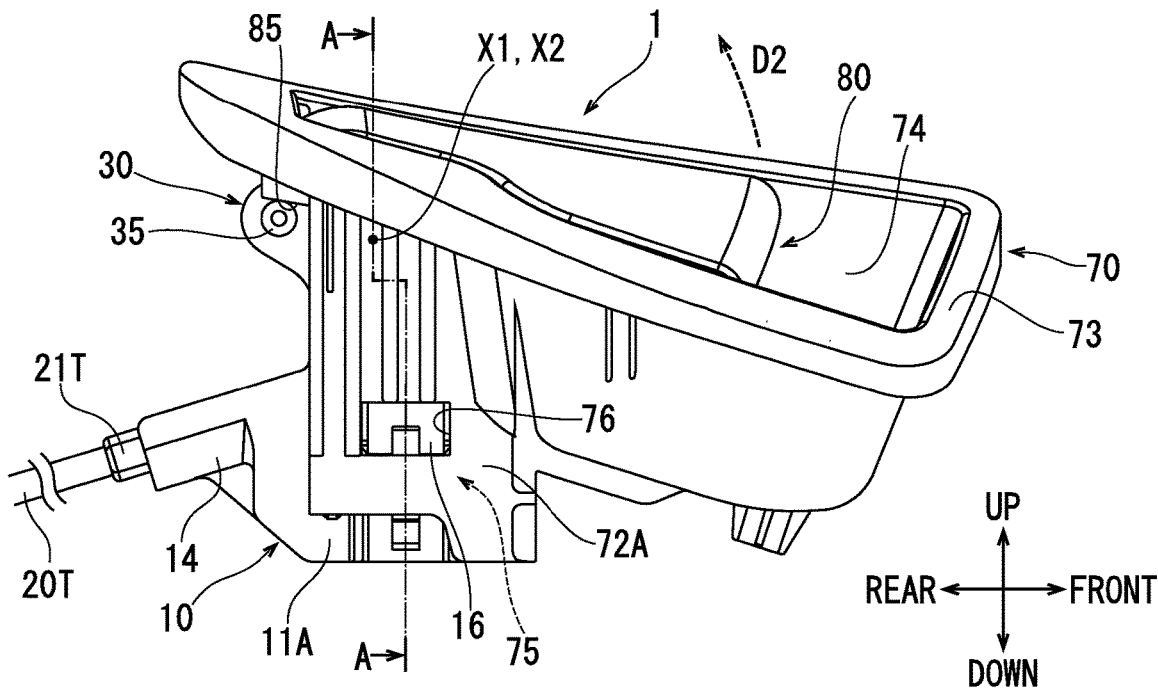
FIG. 6 is a side view of the operation device according to Embodiment 1.

As shown in FIGS. 6 and 7, first and second engaging sections 76 and 76, which are substantially rectangular holes, are formed in the respective second bases 72A and 72B below the first and second shafts 120 and 120 so as to penetrate through the second bases 72A and 72B in the vehicle inward-outward direction.

As shown in FIGS. 4 and 10, the rear end edge of the second base 72A is formed in a rib shape that is bent toward the vehicle outer side and extends in the up-down direction. The rear end edge of the second base 72B is formed in a rib shape that is bent toward the vehicle inner side and extends in the up-down direction.

As shown in FIGS. 7, 9, and 10, the housing chamber 75 is formed (defined) in the handle housing 70. The housing chamber 75 is a space surrounded (defined) by the rear wall 74A of the recessed section 74 and the second bases 72A and 72B. The housing chamber 75 is a space having a substantially rectangular parallelepiped shape that opens upward and downward. The housing chamber 75 opens to the rear between the rear end edge of the second base 72A and the rear end edge of the second base 72B. By being configured in this manner, the second bases 72A and 72B are elastically deformable in the direction of the first axis X1.

Figure 11:
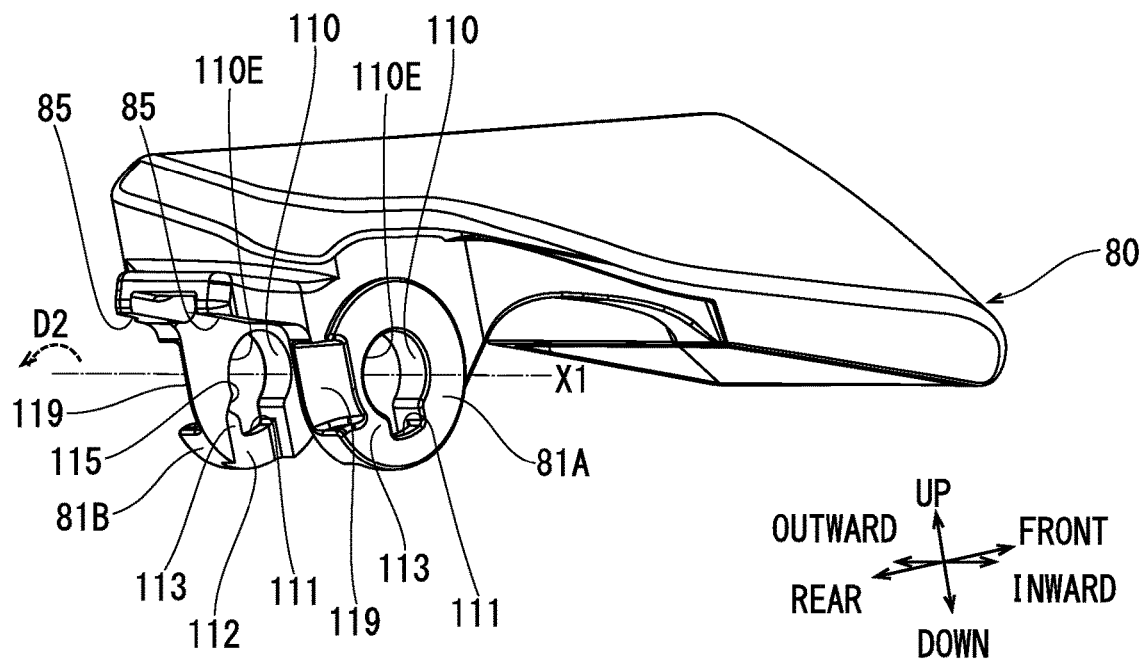
FIG. 11 is a perspective view of an operation lever of the operation device according to Embodiment 1.
Figure 12:
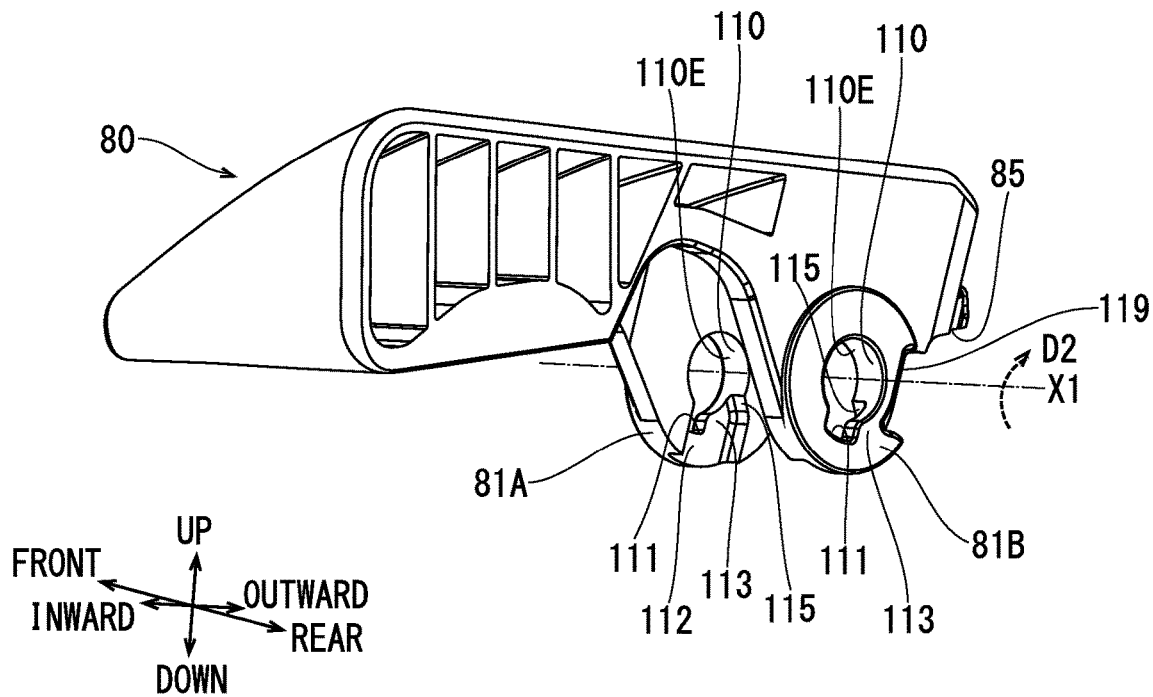
FIG. 12 is a perspective view of the operation lever.

As shown in FIGS. 11 and 12, the operation lever 80 includes first bases (first base walls) 81A and 81B. The first bases 81A and 81B project downward from a rear portion of the operation lever 80 and are separated (spaced apart) from each other in the vehicle inward-outward direction. Owing to this cantilever shape, the first bases 81A and 81B also are elastically deformable in the direction of the first axis X1.

First and second shaft holes 110 and 110 respectively penetrate through the first bases 81A and 81B in the vehicle inward-outward direction and extend in the direction of the first axis X1. The first and second shaft holes 110 and 110 each have an inner sliding surface 110E formed in a cylindrical shape that is concentric with the first axis X1.

It is noted that a first escape section (first recess) 111, a first slip-off preventing section (first lip) 113, a contact section (contact surface) 115, and a first inclined surface 119 are formed (defined, disposed) around each of the first and second shaft holes 110 and 110 in the respective first bases 81A and 81B. The configurations of the first escape sections 111, the first slip-off preventing sections 113, the contact sections 115, and the first inclined surfaces 119 are explained in more detail below.

Figure 13:
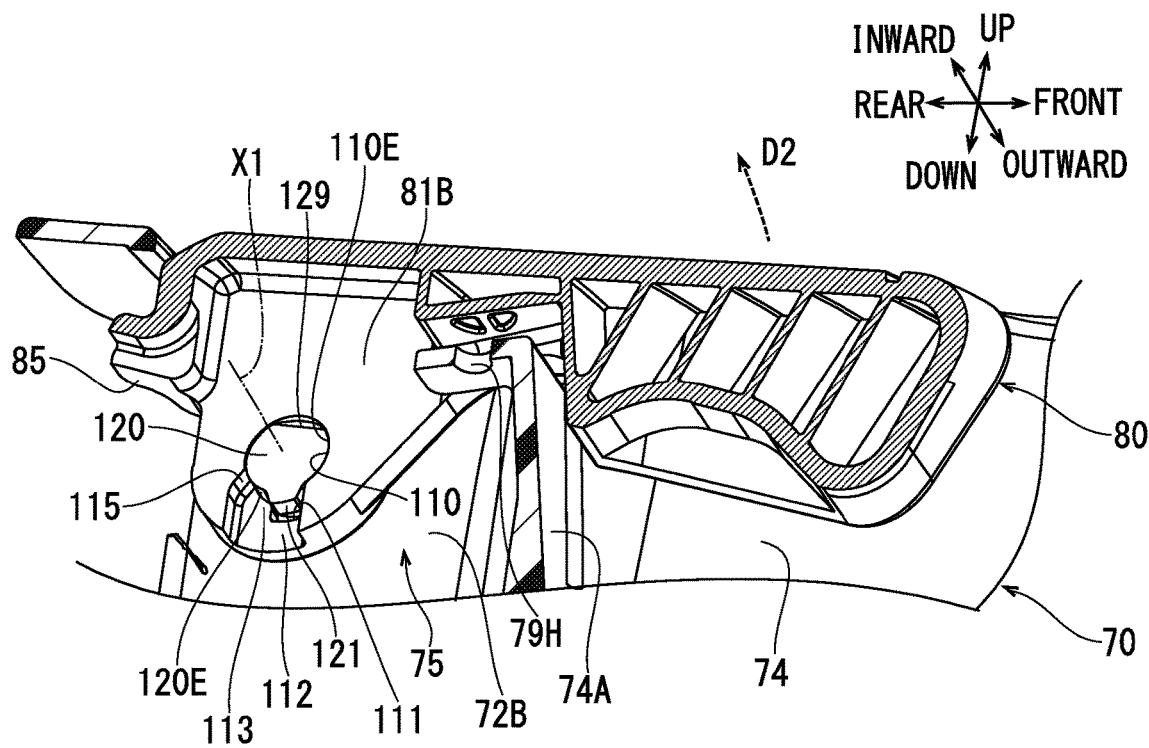
FIG. 13 is a partial perspective view mainly showing a first base and a shaft hole of the operation lever and a second base and a shaft of the handle housing with the operation lever disposed at an (its) initial position.
Figure 14:
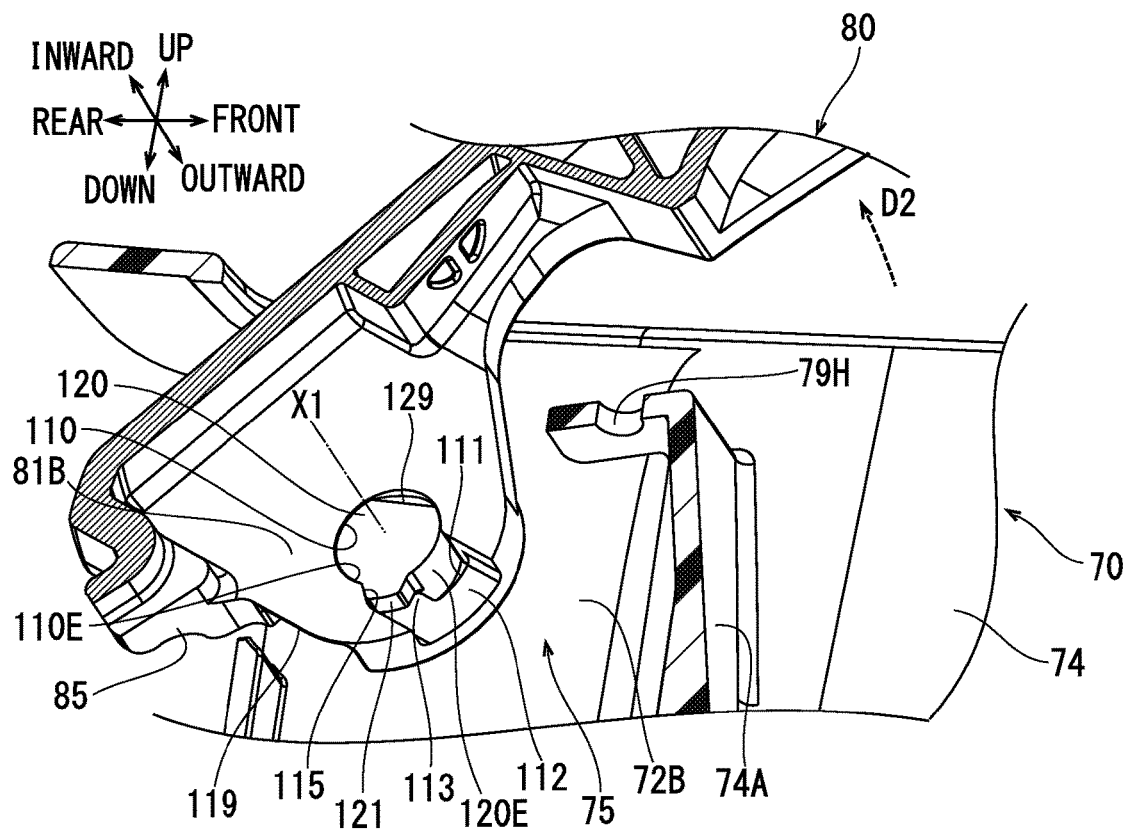
FIG. 14 is a partial perspective view similar to FIG. 13 with the operation lever disposed at an (its) end position.

As shown, e.g., in FIGS. 7, 13, and 14, the first shaft 120 formed on the second base 72A of the handle housing 70 is inserted (pivotably supported) in the first shaft hole 110 in the first base 81A. The second shaft 120 formed on the second base 72B of the handle housing 70 is inserted (pivotably supported) in the second shaft hole 110 in the first base 81B.

That is, the operation lever 80 and the handle housing 70 are coupled by the set of the first base 81A, the first shaft hole 110, the second base 72A, and the first shaft 120 located on the vehicle inner side and by the set of the first base 81B, the second shaft hole 110, the second base 72B, and the second shaft 120 located on the vehicle outer side. As a result, the operation lever 80 is supported by the handle housing 70 so as to be pivotable about the first axis X1.

It is noted that a representative process (method) for assembling (mounting) the operation lever 80 in the handle housing 70 is explained in more detail below.

The operation lever 80 is displaceable (pivotable) between an (its) initial position shown in FIGS. 4, 6, 13, and 16 and an (its) end position shown in FIGS. 14 and 17. The position of the operation lever 80 indicated by a solid line in FIG. 3 is the initial position. The position of the operation lever 80 shown in FIG. 7 is also the initial position. The position of the operation lever 80 indicated by an alternating one long/two short dashed line in FIG. 3 is the end position.

When the operation lever 80 is located in the initial position shown, e.g., in FIG. 4, the operation lever 80 is not being operated (pulled) by the occupant and thus it is housed (accommodated) within the recessed section 74 of the handle housing 70. In this state, the upper surface of the operation lever 80 forms a design (ornamental) surface that preferably matches a design (ornamental) surface of the handle housing 70. At this time, as shown in FIG. 16, the damper 79 stops the operation lever 80 from below, whereby the operation lever 80 is positioned in the initial position.

When the occupant manually operates (e.g., pulls) the operation lever 80 to pivot the operation lever 80 in the operation direction D2 shown, e.g., in FIG. 4, the operation lever 80 displaces (moves, pivots) to the end position shown in FIGS. 14 and 17.

As shown, e.g., in FIG. 11 e, a connecting section 85 is formed in the operation lever 80. The connecting section 85 is a facing-down surface of a convex section that is connected to the root side of the first bases 81A and 81B and projects rearward.

When the operation lever 80 is located in the initial position shown, e.g., in FIG. 4, the connecting section 85 projects from (out of) the housing chamber 75 while being slightly inclined upward toward the rear at a position farther rearward and upward than the first axis X1, as is shown, e.g., in FIGS. 6 and 16.

When the operation lever 80 is displaced (moved, pulled, pivoted) to the end position shown in FIGS. 14 and 17, the connecting section 85 is displaced to a position farther rearward and downward than the first axis X1 and projects from the housing chamber 75 while being inclined downward toward the rear.

As shown in FIG. 8, the link case 10 includes opposing wall sections 11A and 11B, a coupling (connecting) wall section 13, and an outer-tube retaining section 14.

The opposing wall sections 11A and 11B are each formed in a substantially flat shape that extends in the up-down direction and in the front-rear direction while opposing each other in the vehicle inward-outward direction. At the respective upper ends of the opposing wall sections 11A and 11B, shaft holes 11H and 11H penetrate through the opposing wall sections 11A and 11B in the vehicle inward-outward direction. The shaft holes 11H and 11H define a second axis X2 that extends in the vehicle inward-outward direction.

The coupling wall section 13 is formed in a substantially flat shape and couples (connects) the respective front end edges of the opposing wall sections 11A and 11B. The coupling wall section 13 extends in the up-down direction and in the vehicle inward-outward direction.

The outer-tube retaining section 14 couples (connects) lower portions of the respective rear end edges of the opposing wall sections 11A and 11B. The outer-tube retaining section 14 has a substantially U-shaped sectional shape and extends so as to incline downward toward the rear. As shown in FIGS. 4 and 8, a fitting rib 14A is formed on the inside of the outer-tube retaining section 14. The fitting rib 14A includes a concave section configured to mate with (engage) the mating grooves of the end 21T of the outer tube 20T so as to hold the outer tube 20T. A link-lever restricting section 14B, which is a rib-like (rib-shaped) protrusion, is formed farther frontward than the fitting rib 14A on the inside of the outer-tube retaining section 14.

As shown in FIGS. 4 and 6-8, first and second engaged sections 16 and 16 are respectively formed on the opposing wall sections 11A and 11B. The first engaged section 16 of the opposing wall section 11A and the second engaged section 16 of the opposing wall section 11B are formed symmetrically so as to have the same shape.

The first engaged section 16 on the opposing wall section 11A projects toward the vehicle inner side from the opposing wall section 11A and extends downward so as to incline downward and thereafter is recessed in a step shape toward the vehicle outer side. The first engaged section 16 is elastically deformable so that the lower end of the first engaged section 16 is displaceable toward the vehicle outer side.

As shown in FIG. 7, the second engaged section 16 on the opposing wall section 11B projects toward the vehicle outer side from the opposing wall section 11B and extends downward so as to incline downward and thereafter is recessed in a step shape toward the vehicle inner side. The second engaged section 16 is elastically deformable so that the lower end of the second engaged section 16 is displaceable toward the vehicle inner side.

As shown in FIGS. 7 and 8, the link lever 30 is a substantially L-shaped structure having a pivot shaft 31, an end retaining section 32, a connected section 35, and a spring housing section 39.

The pivot shaft 31 includes two column shafts that project from a substantially L-shaped bent portion of the link lever 30 toward the vehicle inner side and toward the vehicle outer side, respectively. As shown in FIG. 8, the end retaining section 32 includes a round hole and a slit. The round hole is formed in a downward end portion of the link lever 30 and the slit is connected to the round hole. The connected section 35 includes two column shafts that project from the upper end of the substantial L shape of the link lever 30 toward the vehicle outer side and toward the vehicle outer side, respectively. The spring housing section 39 extends inward from the vehicle inner side surface of the link lever 30 toward the vehicle outer side and annularly surrounds the pivot shaft 31.

The link lever 30 may be mounted in the link case 10 according to the following representative procedure. First, as shown in FIG. 8, the coil section 89C of the torsion coil spring 89 is housed in the spring housing section 39 of the link lever 30. The first end 89A of the torsion coil spring 89 is locked (affixed) to the link lever 30. The first end 21 of the cable 20 is retained by (in) the end retaining section 32.

Subsequently, the link lever 30 is lowered from a position above the link case 10. The second end 89B of the torsion coil spring 89 is locked (affixed) to a not-shown locking section formed on an inner wall surface (11A) of the link case 10. As shown in FIG. 7, the opposite (terminal) ends of the pivot shaft 31 are respectively inserted into the shaft holes 11H and 11H of the opposing wall sections 11A and 11B. As a result, the link lever 30 is supported by the opposing wall sections 11A and 11B of the link case 10 so as to be pivotable about the second axis X2.

Finally, as shown in FIG. 8, the mating grooves of the end 21T of the outer tube 20T are fit in the concave section of the fitting rib 14A of the outer-tube retaining section 14. Consequently, when the first end 21 of the cable 20 is disposed in the link case 10 and connected to the link lever 30, the end 21T of the outer tube 20T is retained by the outer-tube retaining section 14.

As shown, e.g., in FIGS. 15-17, the counterclockwise direction (in which the link lever 30 pivots about the second axis X2) is denoted as first direction D1. The link lever 30 is urged in the opposite (clockwise) direction of the first direction D1 by the torsion coil spring 89, which is provided between the link case 10 and the link lever 30. When the end retaining section 32 of the link lever 30 is stopped by the link-lever restricting section 14B of the link case 10, the link lever 30 is positioned in (pivoted to) the disconnected (non-contacting) position shown in FIG. 15. In this state, the connected section 35 of the link lever 30 is located at a position where the connected section 35 projects rearward and upward from between the opposing wall section 11A and the opposing wall section 11B of the link case 10.

Thus, the operation device 1 includes a first unit, in which the operation lever 80 is mounted in (on) the handle housing 70, and a second unit, in which the link lever 30, the torsion coil spring 89, the cable 20, and the outer tube 20T are mounted in the link case 10. In the vehicle assembly line, the first and second units of the operation device 1 are assembled together with the vehicle seat 8 and the seat reclining device 5.

During the assembly, the handle housing 70 and the operation lever 80 are first attached to the inner wall of the vehicle interior 9A, and then the link case 10 is displaced (moved) upward from a position below the handle housing 70 as shown in FIG. 16. As shown in FIGS. 4, 6, 7, and 15, the link case 10 is inserted into the housing chamber 75.

As shown in FIG. 7, when the link case 10 is moved into (accommodated in) the housing chamber 75, the first and second engaged sections 16 and 16 of the opposing wall sections 11A and 11B respectively come into slide contact with the second bases 72A and 72B and elastically deform. Thereafter, the first and second engaged sections 16 and 16 respectively engage with the first and second engaging sections 76 and 76 that penetrate through the second bases 72A and 72B. As a result, the link case 10 is affixed to the handle housing 70 so that it will not to slip out the housing chamber 75.

As shown, e.g., in FIGS. 7 and 16, when the link case 10 is housed in the housing chamber 75, the first axis X1 and the second axis X2 are coaxial (aligned). The distal ends of the first and second shafts 120 and 120 of the second bases 72A and 72B respectively oppose the distal ends of the pivot shaft 31 of the link lever 30 in the direction of the first axis X1. It is noted that the fitting (mating) length of the first and second shaft holes 110 and 110 and the first and second shafts 120 and 120 is restricted by such a configuration and is set short.

Further, as shown in FIGS. 4, 6, and 16, when the link case 10 is housed in the housing chamber 75, the connecting section 85 comes into contact with the connected section 35 from above. At this time, the connecting section 85 presses (pushes, displaces) the connected section 35 downward as shown in FIG. 16, whereby the link lever 30 pivots by the angle α1 in the first direction D1 from the disconnected (non-contacting) position shown in FIG. 15. As a result, the link lever 30 is displaced (pivoted) to the first position shown in FIGS. 4, 6, and 16 while elastically deforming (twisting) the torsion coil spring 89 in the first direction D1. The link lever 30 is retained in the first position shown, e.g., in FIG. 16 by the restoring force of the torsion coil spring 89 and by the operation lever 80 contacting the damper 79. That is, the first position of the link lever 30 is a position that corresponds to the operation lever 80 being present (located) in the (its) initial position.

As shown in FIG. 17, when the occupant operates (pulls, pivots) the operation lever 80 and the operation lever 80 is displaced (pivoted) from the (its) initial position to the (its) end position, the link lever 30 pivots farther from the first position by the angle α2 in the first direction D1. As a result, the link lever 30 is displaced (pivoted) to the second position shown in FIG. 17 while further elastically deforming (twisting) the torsion coil spring 89 in the first direction D1. The second position is a position that corresponds to the operation lever 80 being displaced (pivoted) to the (its) end position and is a position displaced from the first position in the first direction D1.

When the link lever 30 is displaced to the second position shown in FIG. 17, the end retaining section 32 is displaced (shifted) forward and thereby pulls the first end 21 of the cable 20 forward. As a result, the position of the striker 53 can be changed in the seat reclining device 5 in the manner explained above.

When the occupant takes his/her hand off the operation lever 80 (i.e. the operation lever 80 is released), the link lever 30 pivots in the opposite direction of the first direction D1 owing to the restoring force of the torsion coil spring 89 and is displaced (pivoted) from the second position to the first position shown, e.g., in FIG. 16. During this pivoting (return) movement, the connected section 35 presses and thus moves the connecting section 85 upward. Therefore, the operation lever 80 returns from the (its) end position to the (its) initial position. The operation lever 80 is retained in the initial position by the operation lever 80 contacting the damper 79.

The configuration of the operation device 1 explained below is advantageous in case the manual force applied to the operation lever 80 by the occupant becomes excessively large when the operation lever 80 is being pivoted from the initial position to the end position.

Configurations of the First Protrusions and the Second Inclined Surfaces

As shown in FIGS. 7, 10, 13, 14, and 18-20, the first protrusions 121 and 121 and the second inclined surfaces 129 and 129 are respectively formed on the first and second shafts 120 and 120 of the second bases 72A and 72B.

The first protrusion 121 and the second inclined surface 129 formed on the first shaft 120 of the second base 72A and the first protrusion 121 and the second inclined surface 129 formed on the second shaft 120 of the second base 72B are formed symmetrically so as to have the same shape. The first protrusion 121 and the second inclined surface 129 formed in the second shaft 120 of the second base 72B are formed as illustrated in FIGS. 13, 14, and 18-20. Illustration and further explanation concerning the first protrusion 121 and the second inclined surface 129 formed on the first shaft 120 of the second base 72A are omitted or simplified as appropriate.

As shown, e.g., in FIGS. 10 and 13, the first protrusions 121 and 121 are respectively formed on the distal end portion and the lower end side of the first and second shafts 120 and 120. The first protrusions 121 and 121 are substantially rectangular parallelepiped small pieces that project downward from the outer sliding surfaces 120E and 120E in the radial outer direction of the first axis X1.

As shown in FIG. 10, a gap in the direction of the first axis X1 is formed between the second base 72A and the first protrusion 121 formed on the first shaft 120 on the second base 72A. A gap in the direction of the first axis X1 is also formed between the second base 72B and the first protrusion 121 formed on the second shaft 120 on the second base 72B.

As shown, e.g., in FIGS. 10 and 13, the second inclined surfaces 129 and 129 are respectively formed on the distal end face of the first shaft 120 on the second base 72A and on the distal end face of the second shaft 120 on the second base 72B. The second inclined surfaces 129 and 129 are disposed on the opposite sides of the first protrusions 121 and 121 across the first axis X1, that is, on the upper end side of the first and second shafts 120 and 120.

The second inclined surface 129 formed on the first shaft 120 on the second base 72A is inclined so as to approach the second base 72A in the direction of the first axis X1 while extending radially outward from the first axis X1. The second inclined surface 129 formed on the second shaft 120 on the second base 72B is inclined so as to approach the second base 72B in the direction of the first axis X1 while also extending radially outward from the first axis X1.

Configurations of the First Escape Sections, the First Slip-Off Preventing Sections, the Contact Sections, and the First Inclined Surfaces As shown in FIGS. 7, 11-14, and 18-20, the first escape sections 111 and 111, the first slip-off preventing sections 113 and 113, the contact sections 115 and 115, and the first inclined surfaces 119 and 119 are respectively formed on the first bases 81A and 81B. Concave sections 112 and 112 are also formed on the first bases 81A and 81B.

The first escape section 111, the first slip-off preventing section 113, the contact section 115, and the first inclined surface 119 formed on the first base 81A and the first escape section 111, the first slip-off preventing section 113, the contact section 115, and the first inclined surface 119 formed on the first base 81B are formed symmetrically so as to have the same shape. The first escape section 111, the first slip-off preventing section 113, the contact section 115, and the first inclined surface 119 formed on the first base 81B are formed as illustrated in FIGS. 13, 14, and 18-20. Illustration and further explanation of the first escape section 111, the first slip-off preventing section 113, the contact section 115, and the first inclined surface 119 formed on the first base 81A are omitted or simplified as appropriate.

As shown, e.g., in FIGS. 11 and 12, the first escape sections 111 and 111 are recessed radially outward from the first axis X1 from the inner sliding surfaces 110E and 110E of the first and second shaft holes 110 and 110. When the operation lever 80 is located in the (its) initial position, the first escape sections 111 and 111 are recessed downward from the lower end sides of the inner sliding surfaces 110E and 110E of the shaft holes 110 and 110. The size of the first escape sections 111 and 111 is set slightly larger than the first protrusions 121 and 121.

As shown in FIG. 12, the concave section 112, the first slip-off preventing section 113, and the contact section 115 are formed on a surface of the first base 81A that faces the vehicle outer side. As shown in FIG. 11, the concave section 112, the first slip-off preventing section 113, and the contact section 115 are formed on a surface of the first base 81B that faces the vehicle inner side, as well as symmetrically in the same shape.

As shown in FIGS. 11 and 12, the concave sections 112 and 112 are recessed in the direction of the first axis X1 at positions that overlap the first escape sections 111 and 111 and extend to the lower ends of the first bases 81A and 81B from the inner sliding surfaces 110E and 110E of the first and second shaft holes 110 and 110. The concave sections 112 and 112 are recessed in wider ranges than the first escape sections 111 and 111 in the circumferential direction of the first axis X1 and in a direction opposite to the operation direction D2.

The first slip-off preventing sections 113 and 113 are parts of thinned portions that result from the shapes of the concave sections 112 and 112 formed in the first bases 81A and 81B. The first slip-off preventing sections 113 and 113 are adjacent to the first escape sections 111 and 111 in the circumferential direction of the first axis X1. The first slip-off preventing sections 113 and 113 are located at positions that deviate in the direction opposite to the operation direction D2 with respect to the first escape sections 111 and 111.

The contact sections 115 and 115 are parts of the side surfaces of the concave sections 112 and 112 in the first bases 81A and 81B and are surfaces adjacent to the first slip-off preventing sections 113 and 113 on the opposite side of the first escape sections 111 and 111. The contact sections 115 and 115 are surfaces facing the circumferential direction of the first axis X1 and the operation direction D2.

As shown in FIG. 11, the first inclined surface 119 is formed on a surface of the first base 81A that faces the vehicle inner side. The first inclined surface 119 on the first base 81A is inclined toward the vehicle outer side while extending radially outward from the first axis X1 and reaches the rear end edge of the first base 81A.

As shown in FIG. 12, the first inclined surface 119 is formed on a surface of the first base 81B that faces the vehicle outer side. The first inclined surface 119 on the first base 81B is inclined toward the vehicle inner side while extending radially outward from the first axis X1 and reaches the rear end edge of the first base 81B.

The first inclined surface 119 on the first base 81B is further explained with reference to FIGS. 14 and 18-20. Explanation of the first inclined surface 119 on the first base 81A is omitted because the explanation is the same as the explanation of the first inclined surface 119 on the first base 81B.

Figure 18:
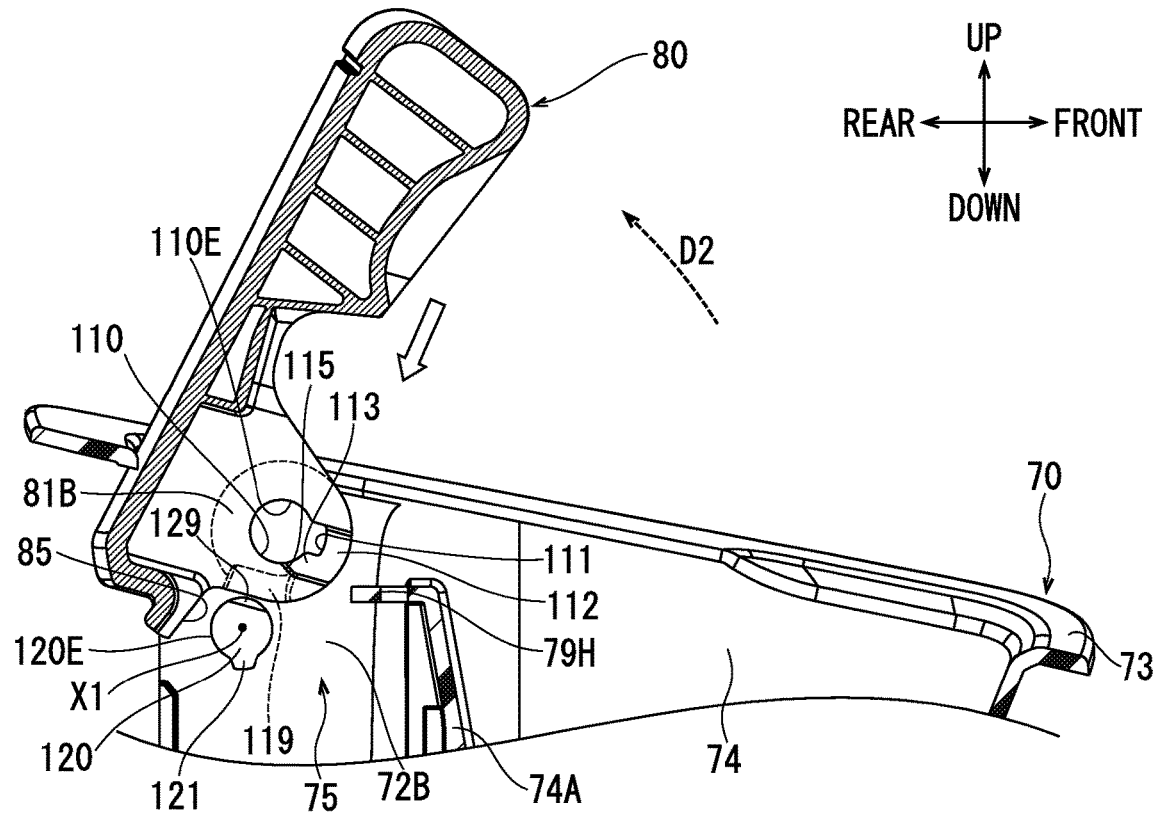
FIG. 18 is a partial sectional view showing the operation lever prior to assembly with the handle housing.
Figure 19:
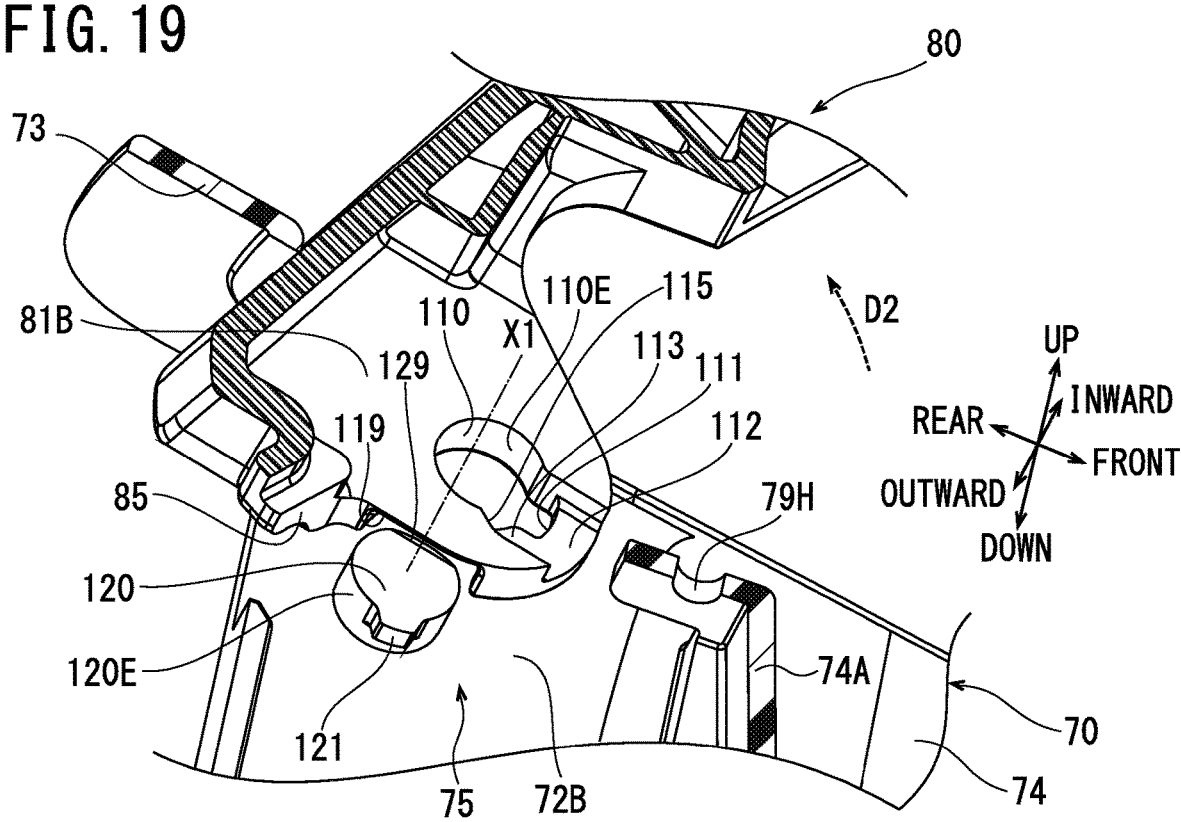
FIG. 19 is a partial perspective view showing the operation lever similar to FIG. 18.
Figure 20:
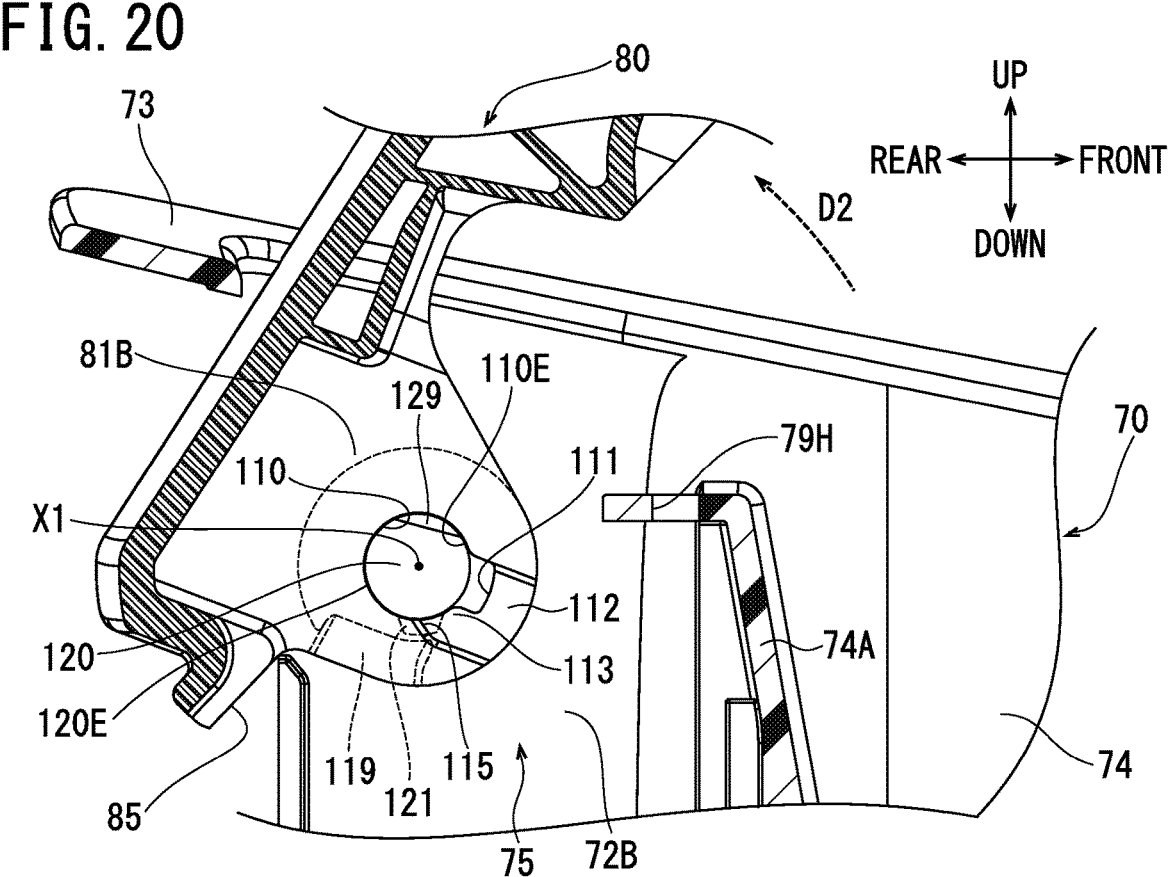
FIG. 20 is a partial sectional view showing the operation lever during assembly with the handle housing.

When mounting the operation lever 80 in the handle housing 70 as shown in FIGS. 18-20 and when the operation lever 80 is mounted in the handle housing 70 as shown in FIG. 4, the first inclined surface 119 on the first base 81B opposes the second base 72B. In this state, the first inclined surface 119 on the first base 81B is inclined so as to separate (be spaced apart) from the second base 72B in the direction of the first axis X1 while extending radially outward from the first axis X1.

As shown in FIG. 20, when viewed along the first axis X1, the first inclined surfaces 119 and 119 are disposed at positions different from the first escape sections 111 and 111 and the first slip-off preventing sections 113 and 113, i.e. at positions that deviate in the direction opposite to the operation direction D2 with respect to the first escape sections 111 and 111 and the first slip-off preventing sections 113 and 113.

Procedure for Mounting the Operation Lever in the Handle Housing

As shown in FIGS. 18 and 19, when the operation lever 80 is being mounted in the handle housing 70, the operation lever 80 is first located above the handle housing 70 in the same posture as the posture of the end position shown in FIGS. 14 and 17. The first inclined surfaces 119 and 119 of the first bases 81A and 81B are located above the second inclined surfaces 129 and 129 of the first and second shafts 120 and 120 formed on the second bases 72A and 72B.

Subsequently, the operation lever 80 is displaced downward so that the first and second shaft holes 110 and 110 and the first and second shafts 120 and 120 coincide when viewed along the first axis X1. At this time, the first inclined surfaces 119 and 119 are brought into slide contact with the second inclined surfaces 129 and 129. Further, the distal end faces of the first and second shafts 120 and 120 are brought into slide contact with the peripheral edges of the first and second shaft holes 110 and 110 in the first bases 81A and 81B. Consequently, the first base 81A and the first base 81B are elastically deformed so as to approach each other in the direction of the first axis X1. The second base 72A and the second base 72B are elastically deformed so as to separate (be spaced apart) from each other in the direction of the first axis X1.

As shown in FIG. 20, when the first and second shaft holes 110 and 110 and the first and second shafts 120 and 120 coincide, the first protrusion 121 on the second base 72A comes into contact with the first base 81A from the vehicle inner side and the first protrusion 121 on the second base 72B comes into contact with the first base 81B from the vehicle outer side. Therefore, the first and second shafts 120 and 120 cannot be inserted (fit) in the first and second shaft holes 110 and 110.

Therefore, the operation lever 80 is pivoted in the opposite direction of the operation direction D2 about the first axis X1 and is displaced to the (its) initial position. As a result of this pivoting movement, the first protrusions 121 and 121 will now coincide with the first escape sections 111 and 111 as shown in FIG. 13. Therefore, the first escape sections 111 and 111 allow the first protrusions 121 and 121 to pass through the first bases 81A and 81B. The first and second shafts 120 and 120 are inserted (fit) in the first and second shaft holes 110 and 110. As a result of the shaft insertion, the elastic deformation of the first bases 81A and 81B and the second bases 72A and 72B is released.

As shown in FIG. 14, when the operation lever 80 is pivoted in the operation direction D2 about the first axis X1 and displaced to the (its) end position, the first slip-off preventing sections 113 and 113 enter the gaps between the second bases 72A and 72B and the first protrusions 121 and 121 to prevent the first and second shafts 120 and 120 from coming out of the first and second shaft holes 110 and 110.

In this state, the contact sections 115 and 115 come into contact with the first protrusions 121 and 121 in the circumferential direction of the first axis X1 to thereby position the operation lever 80 at the end position.

In the operation device 1 according to Embodiment 1, when the operation lever 80 is mounted in the handle housing 70, the operation lever 80 is pivoted in the opposite direction of the operation direction D2 from the state (position) shown in FIG. 20. As shown in FIG. 13, the first and second shafts 120 and 120 are inserted (fit) into the first and second shaft holes 110 and 110. At this time, the first protrusions 121 and 121 are rotated to coincide with the first escape sections 111 and 111. The first escape sections 111 and 111 then allow the first protrusions 121 and 121 to pass through the first bases 81A and 81B. Therefore, the first protrusions 121 and 121 do not interfere with the shaft insertion (fitting).

If the occupant were to (hypothetically) apply an excessively large manual force when pivoting the operation lever 80 from the initial position shown in FIG. 13 to the end position shown in FIG. 14, the excessively large force would (in known operation devices) be transmitted to the first bases 81A and 81B and the second bases 72A and 72B via the first and second shaft holes 110 and 110 and the first and second shafts 120 and 120. Therefore, the first base 81A and the first base 81B would tend to elastically deform so as to approach each other in the direction of the first axis X1. Similarly, the second base 72A and the second base 72B would tend to elastically deform so as to separate (become spaced apart) from each other in the direction of the first axis X1.

However, in the above-described operation device 1, when the operation lever 80 pivots from the initial position to the end position, the first slip-off preventing sections 113 and 113 enter the gaps between the second bases 72A and 72B and the first protrusions 121 and 121. Consequently, the first bases 81A and 81B and the second bases 72A and 72B can be prevented from being elastically deformed in the direction of the first axis X1. As a result, the first and second shafts 120 and 120 can be prevented from coming out of the first and second shaft holes 110 and 110.

Therefore, in the operation device 1 according to Embodiment 1, it is possible to prevent the operation lever 80 from coming off (detaching from) the handle housing 70.

Furthermore, when the first bases 81A and 81B and the second bases 72A and 72B are elastically deformed in the direction of the first axis X1 and the first and second shafts 120 and 120 are inserted (fit) in the first and second shaft holes 110 and 110 as shown in FIGS. 18-20, the distal ends of the first and second shafts 120 and 120 are brought into slide contact with the first inclined surfaces 119 and 119. Consequently, the first and second shafts 120 and 120 are easily inserted into the first and second shaft holes 110 and 110. As shown in FIG. 20, the first inclined surfaces 119 and 119 are disposed at positions different from the first escape sections 111 and 111 and the first slip-off preventing sections 113 when viewed along the first axis X1. Therefore, because the thinned sections of the first bases 81A and 81B can be distributed (spaced apart), it is possible to prevent a decrease in the strength and the rigidity of the first bases 81A and 81B.

Furthermore, when the first bases 81A and 81B and the second bases 72A and 72B are elastically deformed in the direction of the first axis X1 and the first and second shafts 120 and 120 are inserted into the first and second shaft holes 110 and 110 as shown in FIGS. 18-20, the second inclined surfaces 129 and 129 of the first and second shafts 120 and 120 are brought into slide contact with the first bases 81A and 81B. Consequently, the first and second shafts 120 and 120 are easily inserted into the first and second shaft holes 110 and 110. The load (stress) applied when the first protrusions 121 and 121 are brought into slide contact with the first bases 81A and 81B can be reduced because the second inclined surfaces 129 and 129 are disposed on the opposite side of the first protrusions 121 and 121 across the first axis X1. Therefore, breakage of the first protrusions 121 and 121 during assembly can be prevented.

Furthermore, as shown in FIG. 14, the contact sections 115 and 115 of the first bases 81A and 81B position the operation lever 80 at the end position. Consequently, a stopper for stopping the operation lever 80 at the end position does not have to be separately provided. Therefore, a simplified design can be realized.

Furthermore, as shown in FIGS. 9-12, two sets of the first bases 81A and 81B, the first and second shaft holes 110 and 110, the second bases 72A and 72B, and the first and second shafts 120 and 120 are provided. Consequently, because the operation lever 80 is double-supported by the handle housing 70, the design further prevents the operation lever 80 from coming off (detaching from) the handle housing 70.

Embodiment 2

Figure 21:
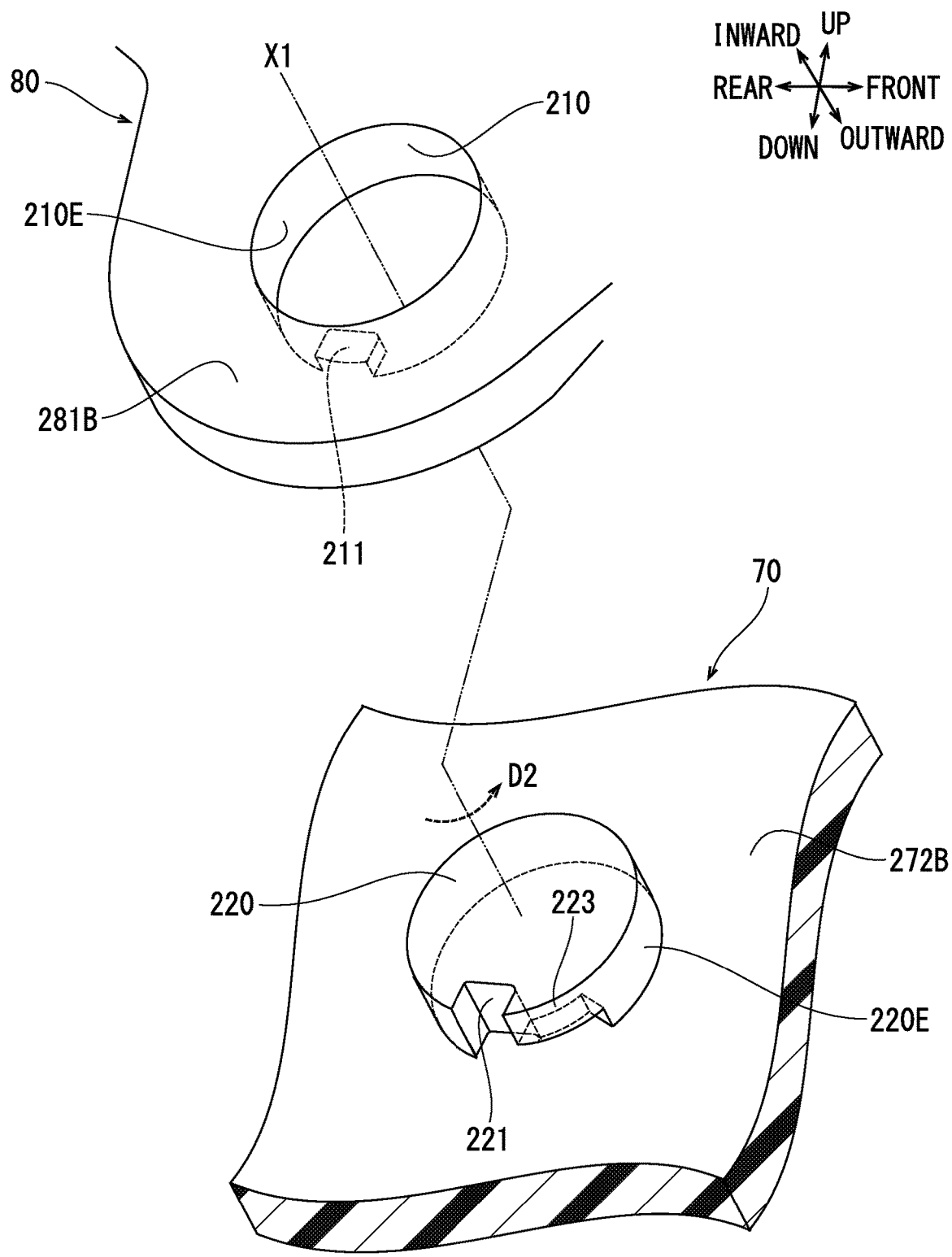
FIG. 21 concerns an operation device according to Embodiment 2 and is a partial perspective view showing a first base and a shaft hole of an operation lever and a second base and a shaft of a handle housing.

As shown in FIG. 21, in an operation device according to Embodiment 2 of the present teachings, a first base 281B and a shaft hole 210 are utilized (instead of the first base 81B and the first and second shaft hole 110 formed in the first base 81B of the operation lever 80 in the operation device 1 according to Embodiment 1). It is noted that the first base 81A and the first and second shaft hole 110 formed in the first base 81A of the operation lever 80 according to Embodiment 1 can be changed in the same manner. However, explanation is omitted.

Furthermore, in the operation device shown in FIG. 21, a second base 272B and a shaft 220 are utilized (instead of the second base 72B and the first and second shaft 120 formed on the second base 72B of the handle housing 70 according to Embodiment 1). It is noted that the second base 72A and the first and second shaft 120 formed on the second base 72A of the handle housing 70 according to Embodiment 1 can be changed in the same manner. However, explanation is omitted.

The other components in Embodiment 2 are the same as the components in Embodiment 1. Therefore, the same components as the components in Embodiment 1 are denoted by the same reference numerals and signs and explanation of the components are omitted or simplified.

It is noted that the first escape section 111, the first slip-off preventing section 113, the contact section 115, and the first inclined surface 119 according to Embodiment 1 are not formed in (on) the first base 281B.

Furthermore, the circular shaft hole 210 penetrates through the first base 281B in the vehicle inward-outward direction. The shaft hole 210 extends in the direction of the first axis X1. The shaft hole 210 has an inner sliding surface 210E formed in a cylindrical shape that is concentric with the first axis X1.

The shaft 220 projects toward the vehicle inner side from the second base 272B and defines the first axis X1. The shaft 220 has an outer sliding surface 220E formed in a cylindrical shape that is concentric with the first axis X1.

A second protrusion 211 is formed at a position opposed to the root side of the shaft 220 in the first base 281B. The second protrusion 211 is a substantially rectangular parallelepiped small piece that projects from the inner sliding surface 210E radially inward to the first axis X1.

The shaft 220 includes a second escape section 221 and a second slip-off preventing section 223. The second escape section 221 is recessed radially inward to the first axis X1 from the outer sliding surface 220E and extends in the direction of the first axis X1 from a position in contact with the second base 272B and opens to the distal end of the shaft 220.

Explanation of the second escape section 221 is simplified because the second escape section 221 is the same as the first escape section 111 according to Embodiment 1. The second escape section 221 allows the second protrusion 211 to pass through the shaft 220 when the shaft 220 is inserted into the shaft hole 210 with the operation lever 80 located (held) in the initial position.

The second slip-off preventing section 223 is adjacent to the second escape section 221 in the circumferential direction of the first axis X1. The second slip-off preventing section 223 is located at a position that deviates in the operation direction D2 with respect to the second escape section 221.

Explanation of the second slip-off preventing section 223 is simplified because the second slip-off preventing section 223 is the same as the first slip-off preventing section 113 according to Embodiment 1. When the operation lever 80 pivots from the initial position to the end position, the second protrusion 211 enters a gap between the second slip-off preventing section 223 and the second base 272B. Consequently, the second slip-off preventing section 223 prevents the shaft 220 from coming out of the shaft hole 210.

In the operation device according to Embodiment 2 configured in this manner, when the shaft 220 is inserted into the shaft hole 210, the second protrusion 211 is prevented from interfering with the shaft insertion by the second escape section 221. Furthermore, even if a manual force applied by the occupant becomes excessively large when the operation lever 80 pivots from the initial position to the end position, the first base 281B and the second base 272B can be prevented by the second protrusion 211 and the second slip-off preventing section 223 from being elastically deformed in the direction of the first axis X1 and the shaft 220 can be prevented from coming out of the shaft hole 210.

Therefore, with the operation device according to Embodiment 2 as well, it is possible to prevent the operation lever 80 from coming off (detaching from) the handle housing 70.

Representative embodiments of the present teachings were explained above with reference to Embodiments 1 and 2. However, the present invention is not limited to Embodiments 1 and 2. It goes without saying that the present invention can be changed as appropriate without departing from the spirit and gist of the present invention.

For example, the operation member is not limited to the operation lever 80 according to Embodiments 1 and 2. The operation member may have any shape, such as a handle, as long as the operation member pivots in response to manual operation (e.g., pulling).

The shaft holes 110 and 210 are through-holes in Embodiments 1 and 2. However, the shaft holes 110 and 210 are not limited to this configuration and may be bottomed holes (blind holes).

In Embodiment 1, two sets of the first bases 81A and 81B, the shaft holes 110 and 110, the second bases 72A and 72B, and the shafts 120 and 120 are provided. However, a cantilever configuration in which the two sets are changed to one set is also included in scope of the present invention.

A configuration in which the same components as the second bases 72A and 72B and the first and second shafts 120 and 120 of the handle housing 70 according to Embodiment 1 are changed to be provided in (on) the operation lever 80 and the same components as the first bases 81A and 81B and the first and second shaft holes 110 and 110 of the operation lever 80 according to Embodiment 1 are changed to be provided in (on) the handle housing 70 is also included in scope of the present invention.

The present invention is usable in any vehicle, facility, etc. that employs a manually-operated operation member.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved operation members (e.g., vehicle seatback reclining levers) and methods for manufacturing and operating the same.

Moreover, combinations of features and steps disclosed in the above detail description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

The invention claimed is:

1. An operation device comprising:
a support member; and
an operation member supported by the support member so as to be pivotable about a pivot axis,
wherein:
the operation member is manually pivotable between an initial position and an end position,
one of the support member and the operation member has a first base and a shaft hole defined in the first base and extending in an axial direction that coincides with the pivot axis, the shaft hole having a circular cylindrical inner sliding surface that is concentric with the pivot axis,
the other of the support member and the operation member has a second base and a shaft projecting from the second base and extending in the axial direction, the shaft having a circular cylindrical outer sliding surface that is concentric with the pivot axis,
the first base and/or the second base is (are) elastically deformable in the axial direction so that the shaft can be inserted into the shaft hole,
a first protrusion is formed on a distal end portion of the shaft and projects radially outward from the circular cylindrical outer sliding surface, and
the first base includes:
a first escape section recessed radially outward from the inner sliding surface, the first escape section being configured to allow the first protrusion to pass through the first base when the shaft is being inserted into the shaft hole with the operation member is located in the initial position; and
a first slip-off preventing section disposed adjacent to the first escape section in a circumferential direction of the shaft hole, the first slip-off preventing section being configured to prevent the shaft from coming out of the shaft hole when the operation member is pivoted from the initial position to the end position;
a first inclined surface of the first base opposes the second base and is inclined so as to separate from the second base in the axial direction while extending radially outward;
the first inclined surface is disposed at a position different from the first escape section and the first slip-off preventing section when viewed along the pivot axis; and
the first inclined surface is configured to come into slide contact with the distal end of shaft when at least one of the first base and the second base is elastically deformed in the axial direction and the shaft is fit into the shaft hole.

2. The operation device according to claim 1, wherein the first base has a contact section that is adjacent to the first slip-off preventing section on an opposite side of the first escape section and is configured to come into contact with the first protrusion when the operation member is pivoted to the end position.

3. The operation device according to claim 1, wherein two sets of the first base, the shaft hole, the second base, and the shaft are provided.

4. The operation device according to claim 3, wherein:
the shaft has a second inclined surface that is inclined so as to approach the second base in the axial direction while extending radially outward, and
the second inclined surface is disposed on an opposite side of the first protrusion across the pivot axis.

5. The operation device according to claim 4, wherein the first base has a contact section that is adjacent to the first slip-off preventing section on an opposite side of the first escape section and is configured to come into contact with the first protrusion when the operation member is pivoted to the end position.

6. The operation device according to claim 1, wherein:
the support member is a housing,
the operation member is an operation lever supported by the housing so as to be pivotable relative to the housing about the pivot axis from the initial position to the end position, the first base is a first base wall, the second base is a second base wall, the first escape section is a first recess that is defined in the first base wall and extends radially outward from the inner sliding surface, the first recess is contiguous with the shaft hole, the first slip-off preventing section is a first lip defined on the first base wall circumferentially adjacent to the first recess, and the first lip defines a portion of the shaft hole and is configured to contact the first protrusion and thereby block the shaft from coming out of the shaft hole when the operation lever is pivoted from the initial position to the end position.

7. The operation device according to claim 6, wherein:
the first inclined surface is circumferentially displaced from the first recess and the first lip.

8. The operation device according to claim 6, wherein:
a second inclined surface is defined on the shaft radially opposite of the first protrusion, and the second inclined surface extends from a distal end surface of the shaft and inclines towards the second base wall in the axial direction while extending radially outward relative to the pivot axis.

9. The operation device according to claim 6, wherein:
a contact surface is defined on the first base wall circumferentially adjacent to the first lip, and the contact surface is configured to abut and stop the first protrusion when the operation lever reaches the end position.

10. The operation device according to claim 9, wherein:
the first inclined surface is circumferentially displaced from the first recess and the first lip.

11. The operation device according to claim 10, wherein:
a second inclined surface is defined on the shaft radially opposite of the first protrusion, and the second inclined surface extends from a distal end surface of the shaft and inclines towards the second base wall in the axial direction while extending radially outward relative to the pivot axis.

12. The operation device according to claim 11, wherein:
one of the housing and the operation lever has two of the first base wall extending generally in parallel, the shaft hole being defined in each of the first base walls, and the other of the housing and the operation lever has two of the second base wall extending generally in parallel, the shaft projecting in the axial direction from each of the second base walls.

13. The operation device according to claim 12, further comprising a link lever having a pivot shaft, a connected section and a torsion spring, wherein the pivot shaft is aligned with the pivot axis and the torsion spring urges the link lever so that the connected section abuts the operation lever and urges the operation lever towards the initial position.

14. The operation device according to claim 13, further comprising a cable coupled to the link lever and being movable relative to a sheath when the link lever is pivoted about the pivot axis.

15. The operation device according to claim 6, further comprising a link lever having a pivot shaft, a connected section and a torsion spring, wherein the pivot shaft is aligned with the pivot axis and the torsion spring urges the link lever so that the connected section abuts the operation lever and urges the operation lever towards the initial position.

16. The operation device according to claim 6, wherein:
one of the housing and the operation lever has two of the first base wall extending generally in parallel, the shaft hole being defined in each of the first base walls, and the other of the housing and the operation lever has two of the second base wall extending generally in parallel, the shaft projecting in the axial direction from each of the second base walls.

17. An operation device, comprising:
a support member; and an operation member supported by the support member so as to be pivotable about a pivot axis, wherein:

the operation member is manually pivotable between an initial position and an end position, one of the support member and the operation member has a first base and a shaft hole defined in the first base and extending in an axial direction that coincides with the pivot axis, the shaft hole having a circular cylindrical inner sliding surface that is concentric with the pivot axis, the other of the support member and the operation member has a second base and a shaft projecting from the second base and extending in the axial direction, the shaft having a circular cylindrical outer sliding surface that is concentric with the pivot axis, the first base and/or the second base is (are) elastically deformable in the axial direction so that the shaft can be inserted into the shaft hole, a first protrusion is formed on a distal end portion of the shaft and projects radially outward from the circular cylindrical outer sliding surface, and the first base includes:
a first escape section recessed radially outward from the inner sliding surface, the first escape section being configured to allow the first protrusion to pass through the first base when the shaft is being inserted into the shaft hole with the operation member is located in the initial position; and a first slip-off preventing section disposed adjacent to the first escape section in a circumferential direction of the shaft hole, the first slip-off preventing section being configured to prevent the shaft from coming out of the shaft hole when the operation member is pivoted from the initial position to the end position;

the shaft has a second inclined surface that is inclined so as to approach the second base in the axial direction while extending radially outward, and the second inclined surface is disposed on an opposite side of the first protrusion across the pivot axis.

18. An operation device comprising:
a support member; and an operation member supported by the support member so as to be pivotable about a pivot axis, wherein:

the operation member is manually pivotable between an initial position and an end position, one of the support member and the operation member has a first base and a shaft hole defined in the first base and extending in an axial direction that coincides with the pivot axis, the shaft hole having a circular cylindrical inner sliding surface that is concentric with the pivot axis, the other of the support member and the operation member has a second base and a shaft projecting from the second base and extending in the axial direction, the shaft having a circular cylindrical outer sliding surface formed that is concentric with the pivot axis, and the first base and/or the second base is (are) elastically deformable in the axial direction so that the shaft can be inserted into the shaft hole, a second protrusion is formed at a position opposed to a root side of the shaft in the first base and project radially inward from the inner sliding surface, and the shaft includes:

a second escape section recessed radially inward from the outer sliding surface, the second escape section being configured to allow the second protrusion to pass through the shaft when the shaft is being inserted into the shaft hole with the operation member is located in the initial position; and a second slip-off preventing section disposed adjacent to the second escape section in a circumferential direction of the shaft hole, the second slip-off preventing section being configured to prevent the shaft from coming out of the shaft hole when the operation member is pivoted from the initial position to the end position.

\* \* \* \* \*